United States Patent
Popovic et al.

(10) Patent No.: US 10,957,027 B2
(45) Date of Patent: Mar. 23, 2021

(54) VIRTUAL VIEW INTERPOLATION BETWEEN CAMERA VIEWS FOR IMMERSIVE VISUAL EXPERIENCE

(71) Applicant: Intel Corporation, Santa Clara, CA (US)

(72) Inventors: Vladan Popovic, Santa Clara, CA (US); Fan Zhang, San Mateo, CA (US); Oscar Nestares, San Jose, CA (US); Kalpana Seshadrinathan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 16/365,539

(22) Filed: Mar. 26, 2019

(65) Prior Publication Data
US 2019/0220963 A1 Jul. 18, 2019

(51) Int. Cl.
*G06K 9/00* (2006.01)
*G06T 5/20* (2006.01)
*G06T 7/00* (2017.01)
*G06T 5/50* (2006.01)
*G06T 3/40* (2006.01)
(Continued)

(52) U.S. Cl.
CPC .............. *G06T 5/20* (2013.01); *G06T 3/4007* (2013.01); *G06T 5/50* (2013.01); *G06T 7/0002* (2013.01); *G06T 7/97* (2017.01); *G06T 15/205* (2013.01); *H04N 13/00* (2013.01); *G06T 2207/10012* (2013.01); *G06T 2207/20228* (2013.01)

(58) Field of Classification Search
CPC .. G06T 5/20; G06T 5/50; G06T 5/004; G06T 5/001; G06T 7/0081; G06T 7/0002; G06T 3/4007; G06T 3/403; G06T 11/60; G06T 11/00; H04N 9/045; H04N 7/012; G06F 17/156; G06F 17/15; G06F 17/243
See application file for complete search history.

(56) References Cited

U.S. PATENT DOCUMENTS 6,642,924 B1 * 11/2003 Kang ..................... G06T 15/40
345/427
7,835,569 B2 * 11/2010 Marcu .................... H04N 1/603
382/162
(Continued)

OTHER PUBLICATIONS

Anderson, et al., "Jump: virtual reality video", ACM Trans. Graph., vol. 35, No. 6, pp. 198:1-198:3, Nov. 2016.
(Continued)

*Primary Examiner* — Amir Alavi
(74) *Attorney, Agent, or Firm* — Green, Howard & Mughal LLP.

(57) ABSTRACT

Techniques related to generating a virtual view of a scene from a position between positions of known input images for presentation to a viewer are discussed. Such techniques include applying a convolution mask that approximates an inverse of a linear combination of at least the horizontal and vertical convolution matrices representative of gradient detection in the input images to a virtual intermediate gradient image that is a combination of at least an interpolated virtual image at the position, an interpolated horizontal gradient map at the position, and an interpolated vertical gradient map at the position to generate a final virtual image for the position.

23 Claims, 9 Drawing Sheets

(51) Int. Cl.
  *G06T 15/20* (2011.01)
  *H04N 13/00* (2018.01)

(56) References Cited

U.S. PATENT DOCUMENTS

| | | | | |
|---|---|---|---|---|
| 8,355,083 | B2* | 1/2013 | Keiser | H04N 5/2224 |
| | | | | 348/559 |
| 8,849,013 | B2* | 9/2014 | Xu | H04N 13/111 |
| | | | | 382/154 |
| 9,026,596 | B2* | 5/2015 | Perez | G02B 27/017 |
| | | | | 709/205 |
| 9,214,040 | B2* | 12/2015 | Smolic | H04N 19/86 |
| 9,438,647 | B2* | 9/2016 | Gibbon | H04N 21/4223 |
| 9,900,583 | B2* | 2/2018 | Gu | G06K 9/46 |
| 10,129,579 | B2* | 11/2018 | Meredith | H04N 21/23439 |
| 10,535,190 | B2* | 1/2020 | Logan | G06T 7/73 |
| 2013/0215239 | A1* | 8/2013 | Wang | G06T 7/579 |
| | | | | 348/50 |
| 2019/0045167 | A1 | 2/2019 | Nestares et al. | |
| 2019/0220963 | A1* | 7/2019 | Popovic | H04N 13/00 |
| 2020/0167929 | A1* | 5/2020 | Wang | G06T 7/194 |

OTHER PUBLICATIONS

Chen, S. et al., "View Interpolation for Image Synthesis", SIGGRAPH '93, Anaheim, CA, 1993.
Facebook, "Surround 360", Retrieved online Apr. 16, 2019 via: https://github.com/facebook/Surround360.
Fusiello, A. et al., "A Compact Algorithm for Rectification of Stereo Pairs", Machine Vision and Applications; vol. 12.1; pp. 16-22; 2000.
Hartley, R. et al., "Multiple View Geometry in Computer Vision", Cambridge Univ. Press (2004).
Jaunt, Retrieved online Apr. 16, 2019 via: https://www.jauntxr.com.
Kang, S.B. et al., "Image-based rendering", Foundations and Trends in Computer Graphics and Vision, vol. 2, No. 3, pp. 173-258, Jan. 2006.
Kopf, J. et al., "Image-based Rendering in Gradient Domain", ACM Trans Graph., vol. 32, No. 6, pp. 199:1-199:9, Nov. 2013.
Mei, et al., "On Building an Accurate Stereo Matching System on Graphics Hardware", IEEE International Conference on Computer Vision Workshops, Barcelona, Spain, 2011.
Mouragnon, E. et al., "Real Time Localization and 3D Reconstruction", IEEE Conference on Computer Vision and Pattern Recognition (CVPR), New York, NY, 2006.
Peleg, S. et al., "Omnistereo: panoramic stereo imaging", IEEE Transactions on Pattern Analysis and Machine Intelligence, vol. 23, No. 3, pp. 279-290, 2001.
Pollefeys, M. et al., "Detailed Real-Time Urban 3D Reconstruction from Video", International Journal of Computer Vision, vol. 78, No. 2-3, pp. 143-167, 2008.
Saegusa, T. et al., "How fast is an FPGA in image processing?", International Conference on Field Programmable Logic and Applications, Heidelberg, 2008.
Shum, H. et al., "A Review of Image-Based Rendering Techniques", Visual Communications and Image Processing, 2000.
Slabaugh, G. et al., "A Survey of Methods for Volumetric Scene Reconstruction from Photographs", International Workshop on Volume Graphics, 2001.
Triggs, B. et al., "Bundle Adjustment—A Modern Synthesis", International Workshop on Vision Algorithms, Corfu, Greece, 1999.
Wikipedia, "Volume rendering", retrieved online Apr. 16, 2019 via: https://en.wikipedia.ord/wiki/volume_rendering.
Zhang, X. et al., "Adaptive streaming in interactive Multiview video systems", IEEE Transactions on Circuits and Systems for Video Technology, 2018.

* cited by examiner

VIRTUAL VIEW INTERPOLATION BETWEEN CAMERA VIEWS FOR IMMERSIVE VISUAL EXPERIENCE

BACKGROUND

Arrays of cameras such as two or more linearly or grid aligned cameras are becoming increasingly common in a variety of device implementations such as tablet devices, smartphone devices, laptop devices, display devices, telepresence systems, and filmmaking and video production systems. In the context of a viewing experience generated by such camera arrays, intermediate virtual views between camera locations are generated and provided to a user for display.

It is an ongoing goal to render realistic virtual images at positions between captured cameras view efficiently and with minimal visual artifacts. Current techniques for rendering virtual views from multiple camera images include volumetric 3D reconstruction of a scene from the images and using 3D graphics rendering techniques to render virtual views. However, 3D reconstruction is computationally expensive and error prone, resulting in visual artifacts in the rendered image. Image-based rendering (IBR) techniques avoid explicit reconstruction of the 3D geometry and instead render the virtual view directly from captured images. For example, IBR interpolation may use two images and their pixel correspondence maps to warp the images to a desired position. Such techniques assume ground truth correspondence maps, disparity maps, or optical flow that are available for computer generated images and small offset of the virtual view from the original images. However, such assumptions are often not met in real life scenes with noisy disparity maps and larger camera offsets leading to undesirable image artifacts. Therefore, existing techniques have shortcomings with respect to computational difficulty and image artifacts, particularly in real life applications.

It may be advantageous to improve views of synthesized intermediate images for enhanced user experience. It is with respect to these and other considerations that the present improvements have been needed. Such improvements may become critical as the desire to display such images or videos in camera array implementations and other contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
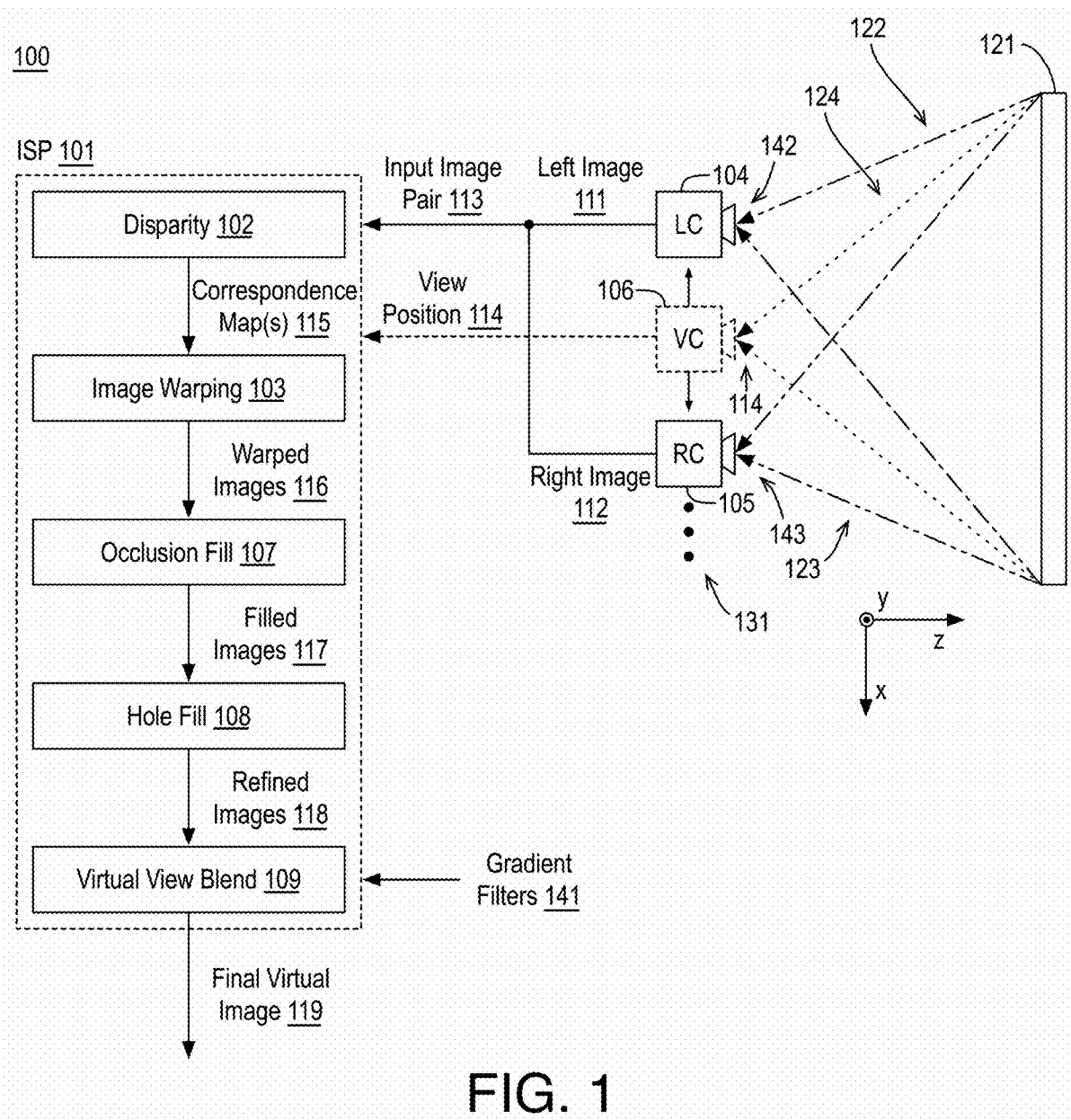
FIG. 1 illustrates an example device for generating a virtual view of a scene.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to generating a virtual view of a scene for a position between positions corresponding to input images of the scene.

As described above, it may be advantageous to improve virtual views, which attempt to approximate a view for a location between locations of available images. For example, to provide an immersive experience for viewing content created by two or more cameras, planar camera arrays, high quality and efficiently generated virtual views for positions between camera positions are needed. Techniques discussed herein render realistic virtual images at positions between captured camera views efficiently, fully automatically, and with no or minimal visual artifacts. Such techniques may render virtual views from a finite sampling of a scene attained using a moving camera, a camera array, or two camera devices. Such multi-view devices and notably, camera arrays, are becoming increasingly common in numerous immersive visual applications including virtual navigation of a scene such as outside-in rendering from multiple views of an object (e.g., volume rendering), generation of stereoscopic panoramas from circular configurations of camera arrays (e.g., inside-out rendering for VR), interactive multi-view video applications (e.g., teleconferencing), etc. The techniques discussed herein may be used in any context where a virtual image is to be generated for a view position that is between the view positions of at least two known input images. The input images may be attained in any suitable manners such as image capture via cameras, image or graphics rendering, or such input images may be received from memory or another device for processing. The disclosed techniques provide efficient, image-based rendering of virtual views with implicit geometry. Such techniques eliminate or minimize visual artifacts and may be implemented in real-time on current hardware platforms.

In some embodiments, a view position for rendering is selected such that the selected view position is between first and second view positions corresponding to first and second input images, respectively. Furthermore, a correspondence map is generated or received for the first and second input images. As used herein, the term correspondence map indicates a map that defines corresponding pixels or regions between two images such that the pixels or regions correspondences attempt to match actual points, objects, surfaces, etc. in the scene the first and second input images represent. For example, a correspondence map may be a disparity map, a depth map, or an optical flow representation of such correspondences. The correspondence may be generated using the first and second input images or it may be received based on a rendering of the first and second input images or the like.

Using the first and second input images and the correspondence map therebetween, a first virtual image is generated for the selected view position. For example, the first virtual image may be generated by warping the first and second images to the selected view position using the correspondence map, weighted averaging the warped images to generate an initial virtual image and performing occlusion fill and hole fill on the initial virtual image to generate the first virtual image. Furthermore, horizontal and vertical gradient maps are generated for the selected view position using similar techniques. For example, the horizontal and vertical gradient maps may be generated based on horizontal and vertical gradients detected in the first and second input images, and the detected gradients (e.g., gradient maps corresponding to the first and second input images) are warped to the selected view position and weighted averaged to generate the horizontal and vertical gradient maps selected view position. The discussed occlusion fill and hole fill techniques may also be applied to the horizontal and vertical gradient maps selected view position. As used herein, the term gradient map indicates an image having gradients from an input image as detected by a gradient filter. That is, a gradient map is an image resulting from application of a gradient filter to an input image.

A horizontal convolution matrix and a vertical convolution matrix representative of detection of the horizontal and vertical gradients, respectively, may then be determined. Notably, the horizontal convolution matrix and a vertical convolution matrix are convolution matrix representations of the detection used to generate the horizontal and vertical gradients. For example, a horizontal gradient filter and a vertical gradient filter may each be represented as convolution matrix gradient filters. In an embodiment, the horizontal and vertical convolution matrix gradient filters are sparse, circulant, Toeplitz matrices representations of the horizontal and vertical gradient filters. A convolution mask or filter is then generated based on the horizontal and vertical convolution matrix gradient filters such that the convolution mask approximates an inverse of a linear combination of at least the horizontal and vertical convolution matrices. As used herein, the term convolution mask indicates a mask or filter having a grid of filter coefficients for application to an input image or virtual intermediate gradient image or the like. In an embodiment, the convolution mask approximates an inverse of a sum of a product of a transpose of the horizontal convolution matrix and the horizontal convolution matrix, a product of a transpose of the vertical convolution matrix and the vertical convolution matrix, and a product of a weighting factor and an identity matrix, as discussed further herein.

As discussed, the convolution mask approximates the inverse of the linear combination of at least the horizontal and vertical convolution matrices. For example, the convolution mask may be a 19×19 filter (or any suitable size or shape) that approximates the inverse. In some embodiments, the convolution mask includes multiple sets of separable filters such that each set has a vertical filter and a horizontal filter. Each set is then applied to the input image and the results are summed. Notably, two or three such sets of separable filters provide filter results that are not noticeably different from results of filtering using the convolution mask itself in some contexts.

The convolution mask is then applied to a virtual intermediate gradient image including a combination of at least the first virtual image, the horizontal gradient map, and the vertical gradient map (which are all relative to the selected view position, as discussed) to generate a final virtual image for the selected view position. The final virtual image may then then provided for presentation to a user. Notably, application of the convolution mask provides an approximation to a solution of an energy minimization problem that minimizes a sum of a gradient energy term (e.g., a term that measures a similarity of horizontal and vertical gradients of the final virtual image to the horizontal and vertical gradient maps) and a global boundary condition energy term (e.g., a term that measures a similarity of the final virtual image to the first virtual image). For example, the energy minimization problem may be highly non-linear and solving for the final virtual image may be difficult to implement. The discussed techniques provide an approximation of the solution using matrix, convolution, and filtering operations that are well suited for hardware implementation and real-time processing.

In some embodiments, application of the convolution mask is performed using separable horizontal and vertical filters with memory operations that offer performance enhanced efficiency. For example, the discussed virtual intermediate gradient image may have a width, W, and a height, H, and the convolution mask may be a separable 2D filter mask separable to a horizontal filter having a width, M, and a vertical filter having a height, N. Applying the convolution mask may then include buffering, sequentially across time instances, only M pixels of a first row of the virtual intermediate gradient image to a shift register (having M available register positions) and applying, via a row filter, the horizontal filter to the M pixels to generate a sequence of horizontally filtered pixel values for the first row. As each pixel value is read, it may be moved to the first position of the shift register and all other values may be shifted by one position. Repetition of such input and horizontal filter application provides a sequence of horizontally filtered pixel values for the first row. The sequence of horizontally filtered pixel values for the first row are stored to one of N−1 memory modules each configured to store an entire row of W filtered pixel values of the virtual intermediate gradient image. Such row processing continues until all of the N−1 memory modules each store a horizontally filtered row. Subsequently, during row processing of the Nth row, a column filter receives one horizontally filtered pixel value from each of the N−1 memory modules as well as a filtered pixel value directly from the horizontal filter (thus providing N pixel values) and the column filter provides vertical filtering and outputs a fully filtered pixel value of the final virtual image. Notably, such column filter processing is also sequential as the N rows of horizontally filtered pixel values are processed. Such processing may then be repeated beginning at the N+1 row of the virtual intermediate gradient image, and so on. Such techniques avoid inefficient resource usage due to requiring the simultaneous access of M×N pixel values for filtering. Furthermore, parallel processing may be advantageously implemented as discussed further herein.

The techniques discussed herein improve the efficiency and visual quality of rendered virtual view images at least in part by providing a series of approximations and transformations to the discussed energy minimization problem to ultimately provide an approximate solution to the problem with a large-support 2D filter (e.g., the convolution mask). Such techniques may be implemented using a field programmable gate array (FPGA) and the large-support 2D filter (e.g., the convolution mask) may be approximated as a sum of two or more separable filters, which may be particularly advantageous in such FPGA implementations using the memory operations discussed herein. The discussed techniques provide real-time virtual view rendering of more than 30 fps based on two 1080p frames.

FIG. 1 illustrates an example device 100 for generating a virtual view of a scene, arranged in accordance with at least some implementations of the present disclosure. As shown in FIG. 1, device 100 includes an image signal processor 101 that implements one or more of a disparity module 102, an image warping module 103, an occlusion fill module 107, a hole fill module 108, and a virtual view blend module 109. Device 100 may also include a left camera 104, and a right camera 105. Device 100 may be implemented in any suitable form factor device such as a personal computer, a laptop computer, a tablet, a phablet, a smart phone, a digital camera, a gaming console, a wearable device, a display device, an all-in-one device, a two-in-one device, or the like. For example, device 100 may perform virtual view rendering or interpolation as discussed herein. In some embodiments, in addition or in the alternative to left camera 104 and right camera 105, device 100 may attain multi-view images for virtual view interpolation from a camera array, a memory, another device, a rendering engine, etc. For example, the components of device 100 may be incorporated into any multi-camera consumer electronic device to deliver immersive visual experiences, in commercial telepresence systems featuring multiple cameras, or in virtual reality (VR) systems.

As shown, left camera 104 receives incoming light 122 from a scene 121. Left camera 104, based on exposure to incoming light 122, generates left image 111 Similarly, right camera 105 receives incoming light 123 from scene 121 and, based on exposure to incoming light 123, generates right image 112. Left camera 104 and right camera 105 may be any suitable imaging device such as RGB cameras, or the like. In some embodiments, device 100 receives left image 111 and right image 112 from another device via a communications channel (not shown). In some embodiments, left image 111 and right image 112 are attained for processing from a memory (not shown) of device 100. Left image 111 and right image 112 may include any suitable image data, picture data, video frame data, or the like or any data structure representative of a picture at any suitable resolution. In an embodiment, left image 111 and right image 112 are RGB image data each having R (red), G (green), and B (blue), values for pixels thereof. In an embodiment, left image 111 and right image 112 have a resolution of 1920× 1080 pixels.

Although illustrated and discussed herein with respect to left and right cameras 104, 105 and left and right images 111, 112, the techniques discussed herein may be implemented for any suitable arrangement of cameras and images. In some embodiments, cameras may be arranged above and below one another and/or images may be top and bottom images. Furthermore, device 100 is illustrated with two cameras—left and right cameras 104, 105—for the sake of clarity of presentation. However, device 100 may include any number of cameras to generate a camera array 131 with such cameras spaced out in the x-direction (to provide a horizontal camera array), the y-direction (to provide a vertical camera array), or both (to provide a camera grid) to generate any number of images. Any of such images may be paired and an intermediate image may be determined for the image pair. Thereby, any number of intermediate images may be generated. Furthermore, more than one virtual image between such image pairs may be generated. For example, one virtual image may be formed as if at a position halfway (or any other position) between the image pair or multiple virtual images may be formed as if at different positions between, the image pair. Herein, without loss of generality, the images of such image pairs are typically labeled first and second or left and right images and an image interpolated therebetween is labeled an virtual image or an intermediate image.

As shown, image signal processor 101 receives left and right images 111, 112 as an input image pair 113 as well as a selected view position 114 corresponding to a virtual camera 106 that illustrates a desired view 124 of scene 121. Notably, device 100 may generate a final virtual image 119 of scene 121 as if from view position 114, which may be at any position between view position 142 of left camera 104 and view position 143 of right camera 105. Selected view position 114 may be generated using any suitable technique or techniques such as detection of a position of a user of device 100, reception as input from a user or a controller, etc.

Figure 2:
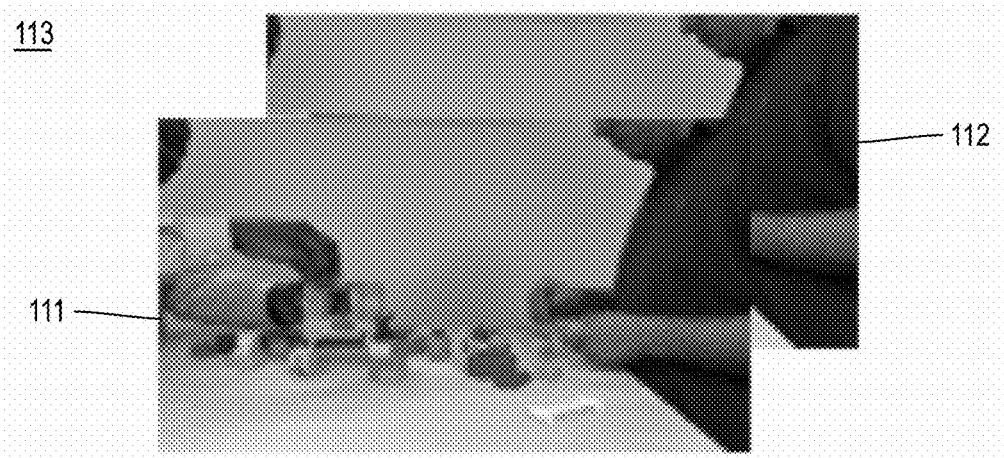
FIG. 2 illustrates example left and right images.

FIG. 2 illustrates example left and right images 111, 112, arranged in accordance with at least some implementations of the present disclosure. As shown in FIG. 2, left and right images 111, 112 may be attained of any suitable scene (in the example, an indoor scene). As discussed, it may be desirable to render or interpolate a virtual view of the scene at a view position between the view positions of left and right images 111, 112. In some embodiments, left and right images 111, 112 are rectified images.

Returning to FIG. 1, image signal processor 101 may implement disparity module 102 to generate one or more correspondence maps 115 between left and right images 111, 112. As discussed, one or more correspondence maps 115 indicate corresponding pixels or regions of pixels between left and right images 111, 112 using disparity values or depth values or the like. Correspondence map(s) 115 may be generated using any suitable technique or techniques such as block matching between left and right images 111, 112, optical flow techniques, IR sensing techniques, etc. In some embodiments, correspondence map(s) 115 are received as an input by ISP 101 and/or device 100.

Figure 3:
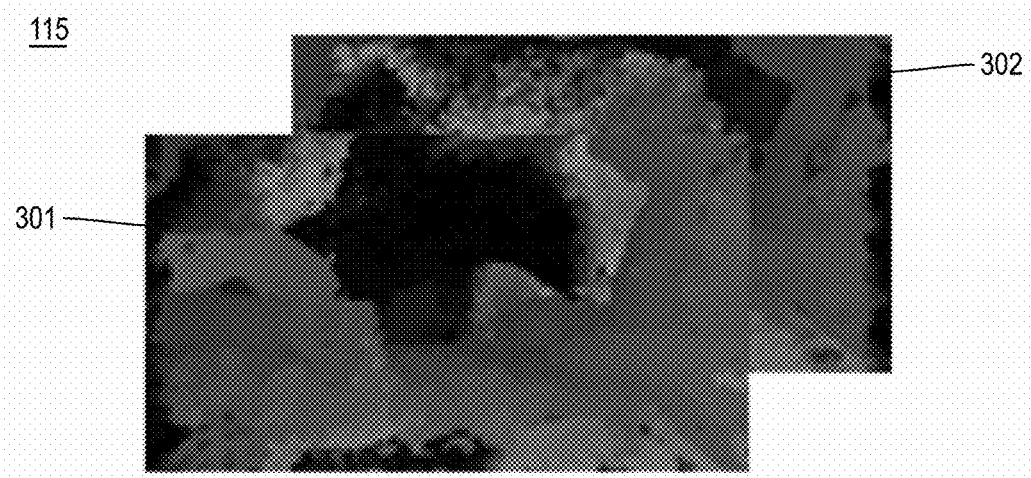
FIG. 3 illustrates example correspondence maps between left and right images.

FIG. 3 illustrates example correspondence maps 115 between left and right images 111, 112, arranged in accordance with at least some implementations of the present disclosure. As shown in FIG. 3, correspondence maps 115 may include disparity or depth values such that nearer pixels are indicated as lighter and farther pixels are indicated as darker in correspondence maps 115. In the illustrated embodiment, correspondence maps 115 include a left correspondence map 301 for left image 111 and a right correspondence map 302 for right image 112. In other embodiments, only a single correspondence map (e.g., disparity map) is used.

Image warping module 103 receives left and right images 111, 112, correspondence map(s) 115, and view position 114, and image warping module 103 generates warped images 116 corresponding to view position 114 using left and right images 111, 112, correspondence map(s) 115, and view position 114. Image warping module 103 may generate warped images 116 using any suitable technique or techniques. For example, herein, left image 111 is denoted as $I_1$, right image 112 is denoted as $I_2$, and final virtual image 119 is denoted as $\hat{I}_p$, where p indicates a selected view position 114, which is normalized to the range of [0, 1]. In some embodiments, image warping module 103 warps neighboring left and right images 111, 112 to selected view position 114 to warped images 116, which will, after occlusion fill and hole fill, be merged to generate a virtual image, which is denoted as $\bar{I}_p$. For example, the virtual image may be generated in accordance with Equation (1):

$$\bar{I}_p = (1-p)*\tilde{I}_{p1} + p*\tilde{I}_{p2} \qquad (1)$$

where $\bar{I}_p$ is the virtual image, $\tilde{I}_{p1}$ is one of warped images 116 (e.g., left image 111 warped to position p), and $\tilde{I}_{p2}$ is the other of of warped images 116 (e.g., right image 112 warped to position p). Warped images 116 at position p may be generated using any suitable technique or techniques such as shifting each pixel of left and right images 111, 112 by a scaled value corresponding to a pixel disparity (or depth or similar value) provided by correspondence maps 115. Notably, due to noisy correspondence maps 115 (e.g., disparity maps), and occlusions in scene 121, warped images 116 typically include pixels with unknown values, which are characterized as image occlusions.

Figure 4:
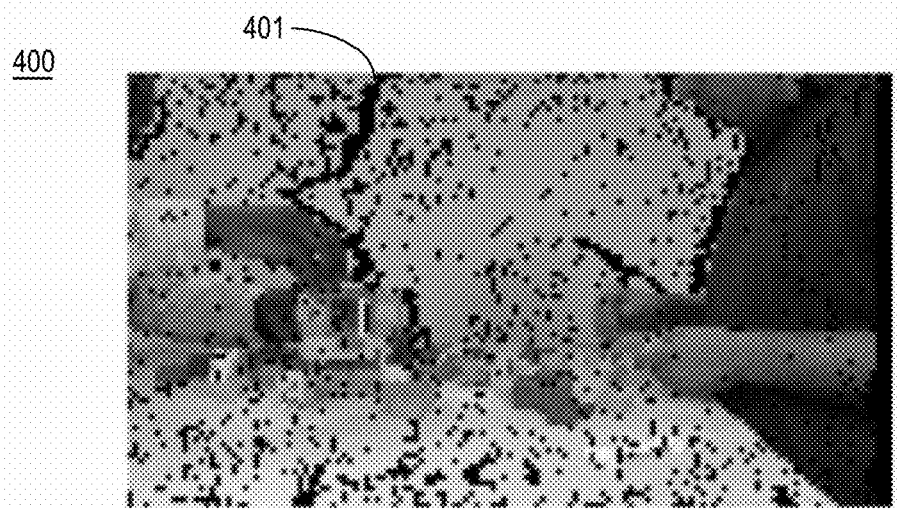
FIG. 4 illustrates an example warped image having occlusions.

FIG. 4 illustrates an example warped image 400 having occlusions 401, arranged in accordance with at least some implementations of the present disclosure. For example, warped image 400 may correspond to one of warped images 116. In FIG. 4, occlusions 401 are illustrated as black pixel locations. Notably, occlusions 401 (e.g., large black areas of warped image 400) appear primarily around the edges of foreground objects due to the inability of correspondence maps 115 (and the disparity estimation techniques used to generate correspondence maps 115) to resolve occlusions 401.

Returning to FIG. 1, occlusion fill module 107 receives warped images 116 having occlusions such as occlusions 401 and occlusion fill module 107 fills such occlusions to generate filled warped images 117. Occlusion fill module 107 may fill any such occlusions using any suitable technique or techniques. In an embodiment, the occlusions are filled by attaining pixel data from the other of input image and re-projecting the pixel data to the warped image using correspondence maps 115. For example, for occlusions in the warped image corresponding to left image 111, pixel from right image 112 are selected and projected to the warped image corresponding to left image 111 to fill the occlusions, and vice versa. Such techniques fill occlusion holes created by occluding objects but may leave some remaining unknown values due to noise in correspondence maps 115.

Figure 5:
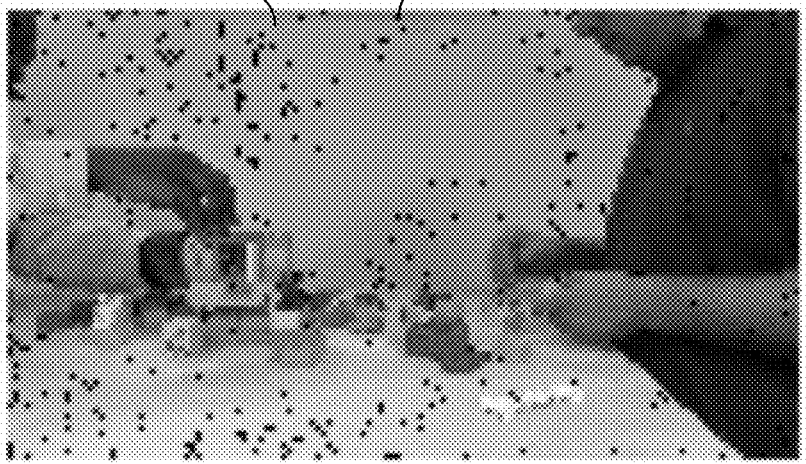
FIG. 5 illustrates an example filled warped image having filled occlusions but remaining holes.

FIG. 5 illustrates an example filled warped image 500 having filled occlusions 501 but remaining holes 502, arranged in accordance with at least some implementations of the present disclosure. For example, filled warped image 500 may correspond to one of filled warped images 117. In FIG. 5, remaining holes 502 are again illustrated as black pixel locations. Notably, filled occlusions 501 have been resolved but holes 502 remain due to noise correspondence maps 115 typically found in uniform regions (e.g., the wall and table surface filled warped image 500).

Returning to FIG. 1, hole fill module 108 receives filled warped images 117 having holes 502 and hole fill module 108 fills such holes to generate refined warped images 118. Hole fill module 108 may fill any such holes using any suitable technique or techniques. In an embodiment, the holes are filled using interpolation techniques such as nearest neighbor interpolation or bilinear interpolation.

Figure 6:
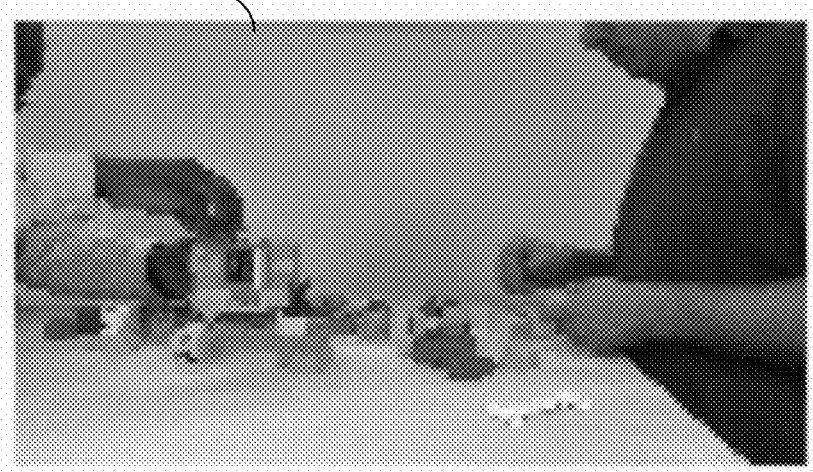
FIG. 6 illustrates an example refined warped image having fully filled pixels.

FIG. 6 illustrates an example refined warped image 600 having fully filled pixels 601, arranged in accordance with at least some implementations of the present disclosure. For example, refined warped image 600 may correspond to one of refined warped images 118. That is, refined warped images 118 includes a first image warped from left image 111 to view position 114 (i.e., $\tilde{I}_{p1}$) and a second image warped from right image to view position 114 (i.e., $\tilde{I}_{p2}$). As shown in FIG. 6, all occlusions and holes have been resolved or filled to generate refined warped image 600.

Returning to FIG. 1, virtual view blend module 109 receives refined warped images 118, correspondence maps 115, view position 114, and gradient filters 141, and virtual view blend module 109 generates a final virtual image 119 corresponding to view position 114.

Figure 7:
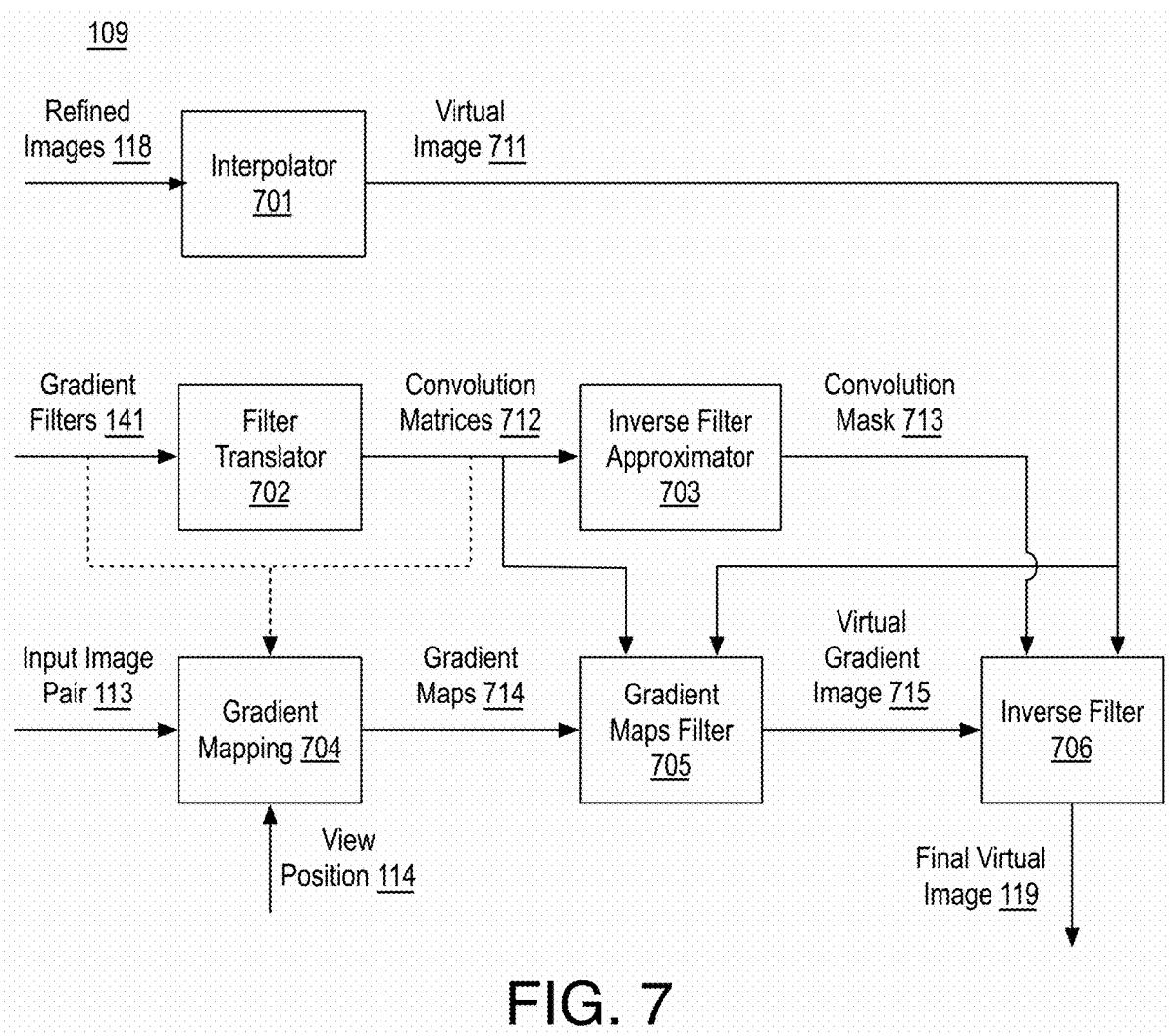
FIG. 7 illustrates an example virtual view blend module.

FIG. 7 illustrates an example virtual view blend module 109, arranged in accordance with at least some implementations of the present disclosure. As shown in FIG. 7, virtual view blend module 109 includes one or more of an interpolator 701, a filter translator 702, an inverse filter approximator 703, a gradient mapping module 704, a gradient maps filter module 705, and an inverse filter module 706. For example, one or more of interpolator 701, filter translator 702, inverse filter approximator 703, gradient mapping module 704, gradient maps filter module 705, and inverse filter module 706 may be implemented via ISP 101 of device 100.

As shown, interpolator 701 receives refined warped image 118 and interpolator 701 generates a virtual image 711. Interpolator may generate virtual image 711 using any suitable technique or techniques. In an embodiment, virtual image 711 is generated as shown with respect to Equation (1) such that virtual image 711 is a weighted average of refined warped images 118 such that the weighting is based on normalized view position 114, however, other weighting functions may be used. Virtual image 711 may be characterized as a naively interpolated result since it may include significant visual artifacts due to noisy correspondence maps 115, occlusion fill, hole fill, etc. In order to refine virtual image 711 and to provide a more robust final virtual image 119, an optimization problem is formulated as discussed further below.

Also as shown, gradient mapping module 704 receives input image pair 113 (e.g., left and right images 111, 112), view position 114, and gradient filters 141 or convolution matrices 712 representative of gradient filters 141 (discussed further herein below), and gradient mapping module 704 generates gradient maps 714. For example, gradient maps 714 may be denoted as $\overline{G_{px}}$ and $\overline{G_{py}}$, and gradient maps 714 are target gradient maps of the virtual view at view position 114 in the x- (i.e., horizontal) and y- (i.e., vertical) dimensions. Gradient maps 714 are generated as discussed with respect to virtual image, J. For example, gradient maps 714 (i.e., a horizontal gradient map and a vertical gradient map) may be generated in accordance with Equation (2):

$$\overline{G_p} = (1-p)*\overline{G_{p1}} + p*\overline{G_{p2}} \quad (2)$$

where $\overline{G_p}$ is the target gradient map (horizontal or vertical), $\overline{G_{p1}}$ is a gradient map of, for example, left image 111 warped to position p), and $\overline{G_{p2}}$ is a gradient map of, for example, right image 112 warped to position p. Notably, Equation (2) is applied to generate both horizontal and vertical target gradient maps 714. The x and y indices are omitted for the sake of clarity of presentation. In some embodiments, gradient maps 714 may also undergo occlusion fill and hole fill operations as discussed with respect to occlusion fill module 107 and hole fill module 108, respectively.

The discussed gradient maps of left and right images 111, 112 may be generated by applying gradient filters 141 or by applying convolution matrices 712 thereto. For example, gradient filters 141 may be linear filters such as neighbor differences filters (e.g., [+1−1]) and filter translator 702 may translate such gradient filters 141 to convolution matrices 712, which are denoted as $G_x$ and $G_y$. As used herein, the term convolution matrix 712 indicates a matrix representative of a filter operation. In some embodiments, a convolution matrix is a sparse, circulant, Toeplitz matrix. That is, convolution matrices 712 may have each descending diagonal thereof from left to right being constant (i.e., they are Toeplitz matrices) with each row vector thereof being rotated one element to the right relative to the preceding row vector (i.e., they are circulant matrices). Furthermore, at least a portion of the elements of convolution matrices 712 may be zero (i.e., they are sparse). Notably, application of gradient filters 141 and convolution matrices 712 may provide the same resultant gradient maps. That is, the horizontal convolution matrix and vertical convolution matrix of convolution matrices 712 are representative of detection of the horizontal and vertical gradients in the same way the detection of the horizontal and vertical gradient detection as performed by gradient filters 141. As used herein, the term representative of with respect to two filters indicates the filters (although applied using different filters or convolutions) provide the same result. The term approximating (or the like), in contrast, indicates one filter approximates the results of the other but the results are not necessarily the same.

Returning now to the previously discussed optimization problem with respect to generating final virtual image 119, the techniques discussed herein creates final virtual image 119 with preserved image gradients (e.g., pixel value differences in both horizontal and vertical dimensions). In an embodiment, such image gradients are preserved by minimizing a $L^2$ error as provided by Equation (3):

$$E_g = \|\hat{G}_{px} - \overline{G_{px}}\|^2 + \|\hat{G}_{py} - \overline{G_{py}}\|^2 \quad (3)$$

where $E_g$ is a gradient energy term that measures similarity of horizontal and vertical gradients of final virtual image 119 to horizontal and vertical gradient maps 714, $\overline{G_{px}}$ and $\overline{G_{py}}$ are horizontal and vertical gradient maps 714 (e.g., target gradient maps at view position 114, p, in the x- and y-dimensions), $\hat{G}_{px}$ and $\hat{G}_{py}$ are the gradient maps of final virtual image 119 (e.g., the gradient maps of the final interpolated image at view position 114, p, in the x- and y-dimensions) such that $$\hat{G}_{px} = \frac{\partial \hat{I}_p}{\partial x}, \hat{G}_{py} = \frac{\partial \hat{I}_p}{\partial y}$$

(e.g., differentials of the image being sought, final virtual image 119). Notably, the gradient energy term provided by Equation (3) measures the similarity (or difference) between horizontal and vertical gradient maps 714 and the gradient maps of final virtual image 119.

Since the gradient energy term provided by Equation (3) is a differential due to the use of gradients, a boundary condition is added to define an overall energy minimization problem. The boundary conditions is characterized as a data energy term and may be defined as provided in Equation (4):

$$E_c = \|\hat{I}_p - \overline{I_p}\|^2 \quad (4)$$

where $\overline{I_p}$ is virtual image 711 and $\hat{I}_p$ is final virtual image 119 (e.g., the image being sought). Notably, the data energy term provided by Equation (4) measures the similarity (or difference) between final virtual image 119 to virtual image 711 (e.g., the interpolated result).

The gradient energy term provided by Equation (3) and the data energy term provided by Equation (4) are then combined (i.e., added) to define an optimization problem that can be minimized to find final virtual image 119 as shown in Equation (5):

$$E = E_g + \lambda E_c \quad (5)$$

where $\lambda$ is a weighting factor that weights the similarity between final virtual image 119 to virtual image 711 over the similarity of the final virtual image to the first virtual image over a similarity between horizontal and vertical gradient maps 714 and the gradient maps of final virtual image 119. The weighting factor may be any suitable value. In an embodiment, the weighting factor is in the range of 0.05 to 0.15, inclusive, with 0.1 being particularly advantageous.

The optimization problem defined by Equation (5) may be characterized as a least squares problem. The following techniques provide an approximate solution to the problem defined by Equation (5) to enable reduced computational costs by relying only on convolution operations (e.g., convolution filter operations). Such convolution operations are well suited for FPGA hardware applications and provide high quality image results with reduced computational costs and enhanced hardware implementation.

In an embodiment, the optimization problem defined by Equation (5) is expressed using matrix operations and explicit computation of a pseudo-inverse to find a solution to the least squares problem of Equation (5). The gradient filter operations defined by gradient filters 141 (which are a selectable feature for implementation) may be expressed using sparse, circulant, Toeplitz matrices as discussed with respect to filter translator 702, which generates convolution matrices 712. Convolution matrices 712 include a horizontal convolution matrix, $G_x$, representative of the horizontal filter of gradient filters 141 and a vertical convolution matrix, $G_y$, representative of the vertical filter of gradient filters 141. The optimization problem defined by Equation (5) may then be expressed as shown in Equation (6):

$$\tilde{I}_p = \min_{\tilde{I}_p} \|\tilde{G}_{p_x} - \overline{G_{p_x}}\|^2 + \|\tilde{G}_{p_y} - \overline{G_{p_y}}\|^2 + \lambda\|\tilde{I}_p - \overline{I_p}\|^2 = \quad (6)$$

$$\min_{\tilde{I}_p} \left\| \begin{pmatrix} G_x \\ G_y \\ \sqrt{\lambda} I \end{pmatrix} \tilde{I}_p - \begin{pmatrix} \overline{G_{p_x}} \\ \overline{G_{p_y}} \\ \sqrt{\lambda} \overline{I_p} \end{pmatrix} \right\|^2$$

where $G_x$ and $G_y$ are convolution matrices 712 (e.g., the convolution matrices for computing the gradient in the x- and y-dimension, respectively), and I is the identify matrix.

The solution to the linear least squares problem defined by Equation (6) may be determined using a pseudo-inverse as shown in Equation (7):

$$\tilde{I}_p = \left( \begin{pmatrix} G_x \\ G_y \\ \sqrt{\lambda} I \end{pmatrix}^T \begin{pmatrix} G_x \\ G_y \\ \sqrt{\lambda} I \end{pmatrix} \right)^{-1} \begin{pmatrix} G_x \\ G_y \\ \sqrt{\lambda} I \end{pmatrix}^T \begin{pmatrix} \overline{G_{p_x}} \\ \overline{G_{p_y}} \\ \sqrt{\lambda} \overline{I_p} \end{pmatrix} = \quad (7)$$

$$(G_x^T G_x + G_y^T G_y + \lambda I)^{-1} (G_x^T \overline{G_{p_x}} + G_y^T \overline{G_{p_y}} + \lambda \overline{I_p})$$

where the superscript T denotes a matrix transposition, the superscript −1 denotes a matrix inverse, and the right side of Equation (7) is a solution (e.g., not an approximation) of the linear least squares problem defined by Equation (6).

The matrices in the right side of Equation (7) may be interpreted as filtering operations with the transpose of a matrix being equivalent to the filter with a reversed coefficient order of the convolution matrix in both the x- and y-directions. Therefore, the right side of Equation (7) includes filter operations on gradient maps 714 and virtual image 711 (e.g., $(G_x^T \overline{G_{p_x}} + G_y^T \overline{G_{p_y}} + \lambda \overline{I_p})$) followed by filtering such an intermediate result using an inverse filter that is a linear combination of simple filters (e.g., the linear combination being $G_x^T G_x + G_y^T G_y + \lambda I$).

For a particular case example, when gradient filters 141 are determined using neighbor differences (e.g., using a horizontal gradient filter of [+1 −1]), then $G_x^T G_x = [-1 \ 2 \ -1]$ (in the y-dimension, the result would be the transpose thereof) and the linear combination of filters would be as shown in Equation (8):

$$G_x^T G_x + G_y^T G_y + \lambda I = \begin{bmatrix} 0 & -1 & 0 \\ -1 & 4+\lambda & -1 \\ 0 & -1 & 0 \end{bmatrix} \quad (8)$$

A convolution mask corresponding to the inverse of the linear combination of filters shown in Equation (8) may then be estimated such that the convolution mask approximates the inverse of the linear combination of filters.

With reference to FIG. 7, inverse filter approximator 703 receives convolution matrices 712 and generates convolution mask 713, which approximates the inverse of the linear combination of filters shown in Equation (8) (e.g., the inverse of $(G_x^T G_x + G_y^T G_y + \lambda I)$). As shown in Equation (7), the linear combination of the horizontal and vertical convolution matrices may include a sum of a product of a transpose of the horizontal convolution matrix and the horizontal convolution matrix, a product of a transpose of the vertical convolution matrix and the vertical convolution matrix, and a product of the weighting factor and the identity matrix (e.g., $G_x^T G_x + G_y^T G_y + \lambda I$). As used herein, the term linear combination indicates any combination of convolution matrices, transposes thereof, and/or any combination of weighting factors and an identity matrix that includes only multiplication and addition of the elements thereof. In an embodiment, the linear combination of the horizontal and vertical convolution matrices includes a sum of a product of a transpose of the horizontal convolution matrix and the horizontal convolution matrix and a product of a transpose of the vertical convolution matrix and the vertical convolution matrix. In an embodiment, the linear combination of the horizontal and vertical convolution matrices comprises a sum of a product of a transpose of the horizontal convolution matrix and the horizontal convolution matrix and a product of a transpose of the vertical convolution matrix and the vertical convolution matrix.

The inverse of the linear combination of filters may be approximated using any suitable technique or techniques to generate convolution mask 713. In an embodiment, multiple preselected convolution masks 713 corresponding to various combinations of weighting factors and gradient filters 141 are stored for use via device 100. A combination of such gradient filters 141 and a weighting factor may then be selected by a user or by an application generating final virtual image 119.

For example, with respect to Equation (8) and a weighing factor of 0.1 (i.e., $\lambda=0.1$), the corresponding convolution mask 713 may be a 19×19 convolution mask. For larger weighting factors, the size of convolution mask 713 may be reduced. In an embodiment, convolution mask 713 has a smaller size in response to the weighting factor being larger and vice versa. Furthermore, convolution mask 713 (e.g., a 19×19 convolution mask) may be approximated by a separable filter or a sum of separable filters, with one separable filter providing a reasonable approximation and more than 2 providing a high quality approximation of the discussed inverse as shown in Equation (7).

Figure 8:
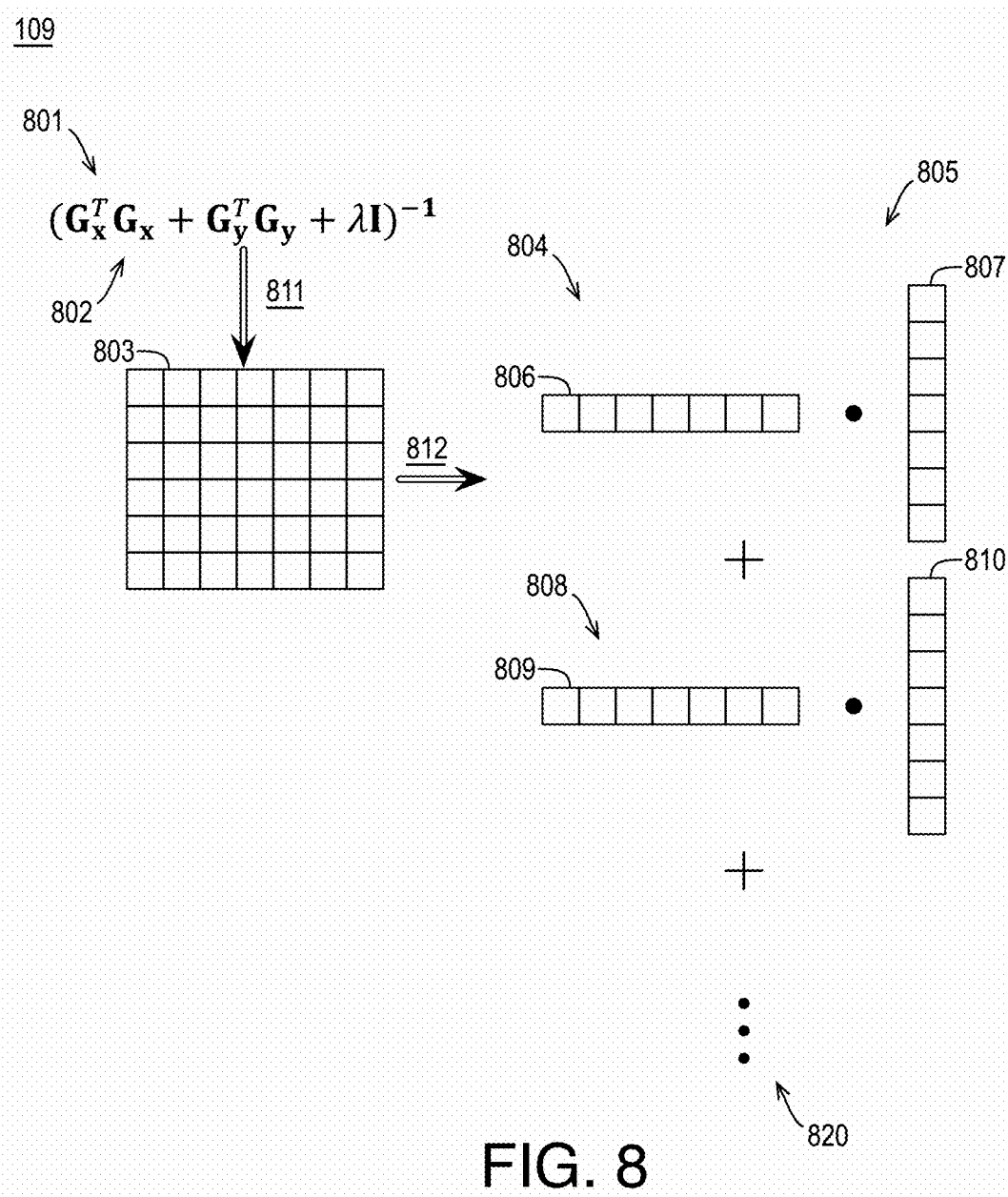
FIG. 8 illustrates an example convolution mask and an example approximation of the convolution mask using a sum of separable filters.

FIG. 8 illustrates an example convolution mask 803 and an example approximation of convolution mask 803 using a sum of separable filters, arranged in accordance with at least some implementations of the present disclosure. As shown in FIG. 8, convolution mask 803, which may be convolution mask 713, approximates (as shown by approximation operation 811) an inverse 801 of a linear combination 802 of horizontal convolution matrix, $G_x$, vertical convolution matrix, $G_y$, the weighting factor, $\lambda$, and the identity matrix, I. In the illustrated embodiment, linear combination 802 is a sum of a product of a transpose of the horizontal convolution matrix and the horizontal convolution matrix, a product of a transpose of the vertical convolution matrix and the vertical convolution matrix, and a product of the weighting factor and the identity matrix.

In the illustrated embodiment, convolution mask 803 is a 7×7 convolution mask, which may have corresponding filter weights in each grid position thereof. However, convolution mask 803 may be any size and shape. In an embodiment, convolution mask 803 is a 19×19 convolution mask. In an embodiment, convolution mask 803 has dimensions of not less than 15×15 filter weights. Furthermore, convolution mask 803 may be square, as shown, or diamond shaped or any other suitable shape.

In the context of FIG. 7, convolution mask 803 may be applied to virtual gradient image 715 as a 2D filter in some embodiments. In other embodiments, convolution mask 803 may be applied as a sum 805 of any number 820 of separable filters 804, 808, and so on. For example, as shown via approximation operation 812, convolution mask 803 may be approximated as sum 805 of 2D separable filters 804, 808 such that 2D separable filter 804 includes a 1D horizontal filter 806 and a 1D vertical filter 807, 2D separable filter 808 includes a 1D horizontal filter 809 and a 1D vertical filter 810, and so on. In operation, with respect to FIG. 7, inverse filter module 706 may apply 2D separable filter 804 to virtual gradient image 715 (e.g., by applying 1D horizontal filter 806 and then 1D vertical filter 807) and inverse filter module 706 may apply 2D separable filter 8008 to virtual gradient image 715 (e.g., by applying 1D horizontal filter 809 and then 1D vertical filter 810) and inverse filter module 706 may sum the results to generate final virtual image. As discussed, convolution mask 803 may be approximated by a single separable 2D filter or as a sum of any number (e.g., 2 or 3) separable 2D filters.

Returning to FIG. 7, as shown, gradient maps filter 705 receives gradient maps 714, convolution matrices 712, and virtual image 711, and gradient maps filter 705 generates a virtual gradient image 715 such that virtual gradient image 715 includes the previously discussed filter operations on gradient maps 714 (e.g., $(G_x^T\overline{G_{px}}+G_y^T\overline{G_{py}}+\lambda \overline{I_p})$). As used herein, the term virtual gradient image indicates an image including a combination of virtual image 711, the horizontal gradient map of gradient maps 714, and the vertical gradient map gradient maps 714.

In an embodiment, virtual gradient image 715 is a sum of a convolution of the horizontal gradient map by a transpose of the horizontal convolution matrix (i.e., $G_x^T\overline{G_{px}}$), a convolution of the vertical gradient mask by a transpose of the vertical convolution matrix (i.e., $G_y^T\overline{G_{py}}$), and a product of the weighting factor and virtual image 711 (i.e., $\lambda \overline{I_p}$). In an embodiment, the virtual intermediate gradient image includes a sum of a convolution of the horizontal gradient map by a transpose of the horizontal convolution matrix and a convolution of the vertical gradient mask by a transpose of the vertical convolution matrix. As used herein, the term convolution indicates the processing of an image using a kernel, convolution matrix, mask, or filter, with such terms being used interchangeably.

As shown, the resultant virtual gradient image 715 is provided to inverse filter module 706, which applies convolution mask 713 to resultant virtual gradient image 715 to generate final virtual image 119. In an embodiment, inverse filter module 706 applies convolution mask 713 to resultant virtual gradient image 715 to generate final virtual image 119 in accordance with Equation (7). In an embodiment, inverse filter module 706 applies convolution mask 713, convolution mask 713 approximating an inverse of a linear combination of at least convolution matrices 712, to a virtual gradient image 715, which is a combination of at least virtual image 711 and gradient maps 714. As discussed, final virtual image 119 may have no or minimal image artifacts for enhanced viewer experience.

Figure 9:
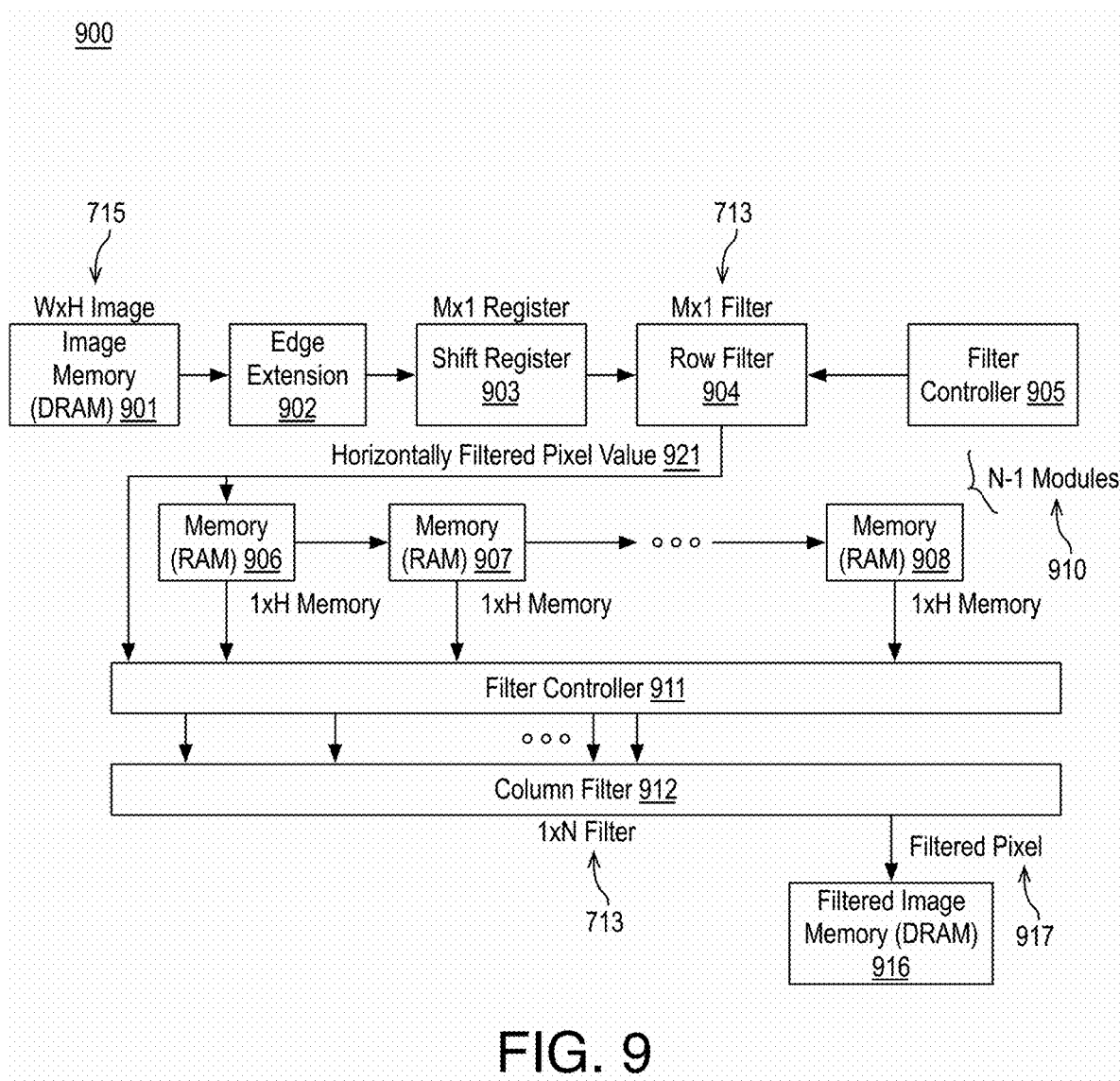
FIG. 9 illustrates an example system for applying an example separable convolution mask to an example virtual gradient image.

FIG. 9 illustrates an example system 900 for applying an example separable convolution mask 713 to an example virtual gradient image 715, arranged in accordance with at least some implementations of the present disclosure. As shown in FIG. 9, system 900 includes an image memory 901, an edge extension module 902, a shift register 903, a row filter 904, filter controllers 905, 911 (which may be implemented together or separately), memory modules 906-908, a column filter 912, and a filtered image memory 916. Although discussed with respect to applying separable convolution mask 713 to virtual gradient image 715, system 900 may apply any separable convolution mask or filter (e.g., a 2D filter separable to two 1D filters) to any image data (e.g., any input image). Furthermore, system 900 may be implemented via device 100 or any other suitable device or platform. In an embodiment, system 900 or any portions thereof are implemented via an FPGA.

As shown, virtual gradient image 715 may be stored via image memory 901. Image memory 901 may be any suitable memory such as dynamic random access memory (DRAM). Virtual gradient image 715 may have any suitable size (i.e., having an image width of W pixels and an image height of H pixels) such as 1920×1080 pixels. Furthermore, separable convolution mask 713 may have any suitable size (e.g., having a horizontal filter of size M with M filter weights and a vertical filter of size N with N filter weights, typically M=N).

As shown, M pixels of a particular row of virtual gradient image 715 are read from image memory 901 and are buffered in shift register 903. That is, at any particular time instance, shift register 903 buffers M (e.g., M×1) pixel values of a particular row of virtual gradient image 715. For the particular time instance, row filter 904 receives the M buffered pixel values and applies the 1D horizontal separable filter of virtual gradient image 715 thereto to generate a horizontally filtered pixel value 921 for the M buffered pixel values. After horizontal filtering, a next pixel value from virtual gradient image 715 is attained from image memory 901 and moved into a first position of shift register 903 with the remaining pixels moving one position and a final value being discarded from shift register 903. Such sequential processing continues for virtual gradient image 715. The present M buffered pixel values are then horizontally filtered to generate a next horizontally filtered pixel value 921, and so on through the entire row of pixel values from the particular row of virtual gradient image 715. Notably, edge extension 902 may provide pixel values around the edge of virtual gradient image 715 using extrapolation techniques.

For a particular row of horizontally filtered pixel values 921, each of the filtered values are stored in one or memory modules 906-908. As shown, system 900 includes a memory bank 910 of N−1 memory modules 906-908 that are each configured to store an entire row of horizontally filtered pixel values 921. That is, each of memory modules 906-908 are configured to store H horizontally filtered pixel values 921. Memory modules 906-908 any suitable memory such as static random access memory (SRAM). Memory modules 906-908 may be dual port line buffers and memory bank 910 may be a chain or line buffers implemented, for example, in an FPGA. As shown, the row of horizontally filtered pixel values 921 may be stored in a first memory module 906 such that the row of horizontally filtered pixel values 921 is only provided to memory module 906 (and not to any other modules). The row of horizontally filtered pixel values 921 is simultaneously provided to filter controller 911 as discussed below.

Once horizontal filtering is complete for a row of virtual gradient image 715, a next row is processed in a like sequential manner as discussed above to generate another (second) row of horizontally filtered pixel values 921. The second row of horizontally filtered pixel values 921 are again provided only to first memory module 906 (and to filter controller 911). As shown the previous row of horizontally filtered pixel values 921 are transitioned to second memory module 906 while any other previous row are also cascaded to other memory modules. That is, a previously stored row of horizontally filtered pixel values 921 stored in memory module 906 is transferred to memory module 907, a previously stored row of horizontally filtered pixel values 921 stored in memory module 907 is transferred to a subsequent memory module of memory bank 910, and so on memory module 908. The previously stored row of horizontally filtered pixel values 921 stored in memory module 908 is discarded.

Notably, when each of memory modules 906-908 of memory bank 910 includes a row of horizontally filtered pixel values 921 stored therein, filter controller 911 begins to retrieve one each of the horizontally filtered pixel values 921 from each of memory modules 906-908 as well as a horizontally filtered pixel value 921 directly from row filter 904. Thereby, filter controller 911 attains N horizontally filtered pixel values 921 that aligned vertically (e.g., in a column) for filtering by column filter 912 (e.g., a 1×N vertical filter of separable convolution mask 713) to generate a filtered pixel 917, which is stored to filtered image memory 916. Notably, filtered pixel 917 has been filtered horizontally and vertically and is therefore a fully filtered pixel value. Such processing continues for all horizontally filtered pixel values 921 of the row being filtered by row filter 904 such that all such horizontally filtered pixel values 921 are vertically filtered to generate filtered pixel values 917 to generate a row of fully filtered values stored to filtered image memory 916. Filtered image memory 916 may be any suitable memory such as dynamic random access memory (DRAM).

As discussed, the current row of horizontally filtered pixel values 921 are also sequentially stored (as pixel values are retrieved by filter controller 911) into memory module 906 such that processing may continue as discussed for the next filtered row. That is, filter back 910 maintains N−1 rows of horizontally filtered pixel values 921 for retrieval by filter controller 911 and filtering by column filter 912, while the Nth row is provided in real-time and stored (for processing of the N+1 row) and so on.

Thereby, for virtual gradient image 715 having a width, W, and a height, H, and convolution mask 713 that is a separable 2D filter mask separable to a horizontal filter having a width, M, and a vertical filter having a height, N, applying convolution mask 713 includes buffering, sequentially across time instances, only M pixels of a particular row of virtual gradient image 715 to shift register 903 and applying, via row filter 904, the M×1 horizontal filter to the M pixels to generate a sequence of horizontally filtered pixel values 921 for the first row. The sequence of horizontally filtered pixel values 921 (for the first row) are stored to memory module 906 (e.g., one of N−1 memory modules of memory bank 910) such that each of memory modules 906-908 are configured to store an entire row of W horizontally filtered pixel values 921 of virtual gradient image 715. Then, in response to each of the N−1 memory modules 906-908 having a row of filtered pixel values, filter controller 911 retrieves one horizontally filtered pixel value from each of the N−1 memory modules 906-908 and one horizontally filtered pixel value from row filter 904 and column filter 912 applies the vertical filter to the N horizontally filtered pixels to generate a convolution mask filtered pixel value 917, which is stored to filtered image memory 916. Such processing continues sequentially for each row of virtual gradient image 715 with each processed row being both stored to memory module 906 and provided to filter controller 911 (for processing by column filter 912) such that the storage of the row to memory module 906 also shifts each previously stored row to a subsequent one of memory modules 906-908. Thereby, each row of horizontally filtered pixel values 921 are aligned for column filtering.

The above techniques eliminate the need for simultaneous access to all pixels required by convolution mask 713 (e.g., M×N such as 19×19), which requires many reads from memory and slow data rates in previous architectures. Such techniques provide for real-time processing and reduction of required hardware resources by reducing the critical path delay using a pipeline architecture. System 900 includes a chain of 18, for example, line buffers as provided by memory modules 906-908 after row filter 904. The line buffer chain may be implemented using hard memory blocks in FPGA. As discussed, whenever a new horizontally filtered pixel arrives, it is stored in the first line buffer at the location addressed by the pixel's column in the frame. In some embodiments, the instantiated FPGA block is a dual-port memory and the second port is used for reading the pixel from the same memory location (e.g., the pixel in the same column from the previous row). The read pixel is then stored in the following buffer in the chain and so on. The outputs of the, for example, 18 line buffers (e.g., N−1 buffers) and the output of the row filter form a set of 19 vertically neighboring pixels (e.g., 19 horizontally filtered pixels that are vertically aligned). Thereby, the horizontally filtered pixels are available in the correct order for column filter 912. As discussed, system 900 may also include edge extension module 902 to preserve image resolution and quality around the edges thereof. Furthermore, filter controllers 905, 911 may be used to enable and disable row filter 904 and column filter 912 to support image sub-sampling (e.g., by skipping processing of every other pixel or the like) or cropping (e.g., by not processing pixels outside of the crop area). Such filter control supports different output resolutions and virtual cropped windows.

Figure 10:
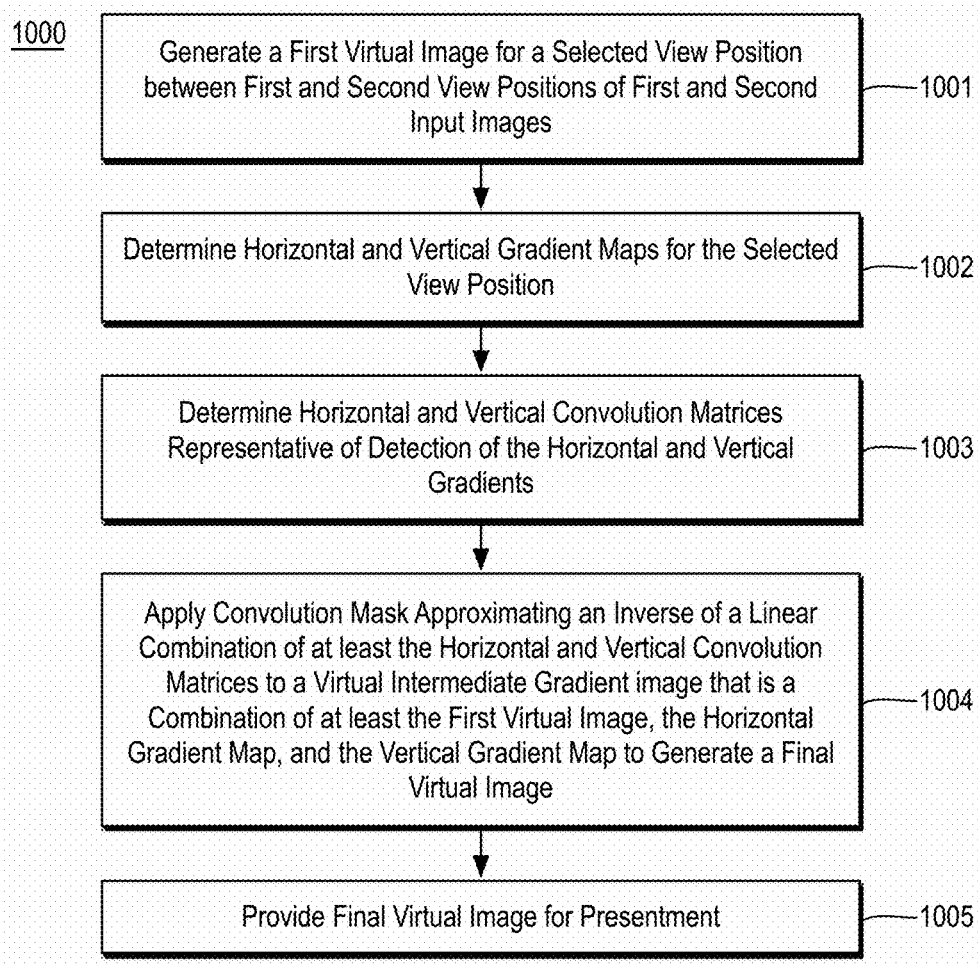
FIG. 10 is a flow diagram illustrating an example process for generating a virtual view of a scene.

FIG. 10 is a flow diagram illustrating an example process 1000 for generating a virtual view of a scene, arranged in accordance with at least some implementations of the present disclosure. Process 1000 may include one or more operations 1001-1005 as illustrated in FIG. 10. Process 1000 may form at least part of a virtual view generation process. By way of non-limiting example, process 1000 may form at least part of a virtual view generation process as performed by device 100 as discussed herein. Furthermore, process 1000 will be described herein with reference to system 1100 of FIG. 11.

Figure 11:
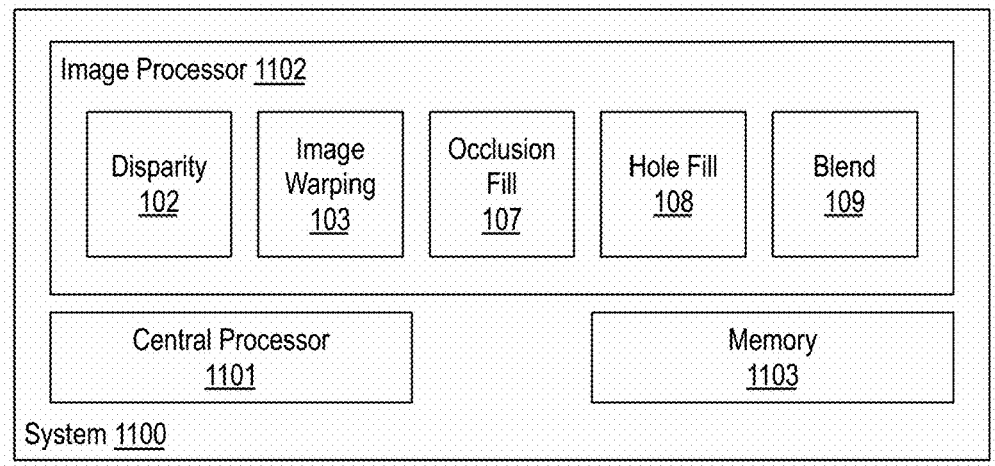
FIG. 11 is an illustrative diagram of an example system for generating a virtual view of a scene.

FIG. 11 is an illustrative diagram of an example system 1100 for generating a virtual view of a scene, arranged in accordance with at least some implementations of the present disclosure. As shown in FIG. 11, system 1100 may include a central processor 1101, an image processor 1102, and a memory 1103 Also as shown, image processor 1102 may include or implement disparity module 102, image warping module 103, occlusion fill module 107, hole fill module 108, and virtual view blend module 109. In the example of system 1100, memory 1103 may store image or frame data, warped image or frame data, filled warped image or frame data, refined warped image or frame data, final virtual image or frame data, convolution matrices, gradient filters, gradient maps, virtual gradient images, or any other data discussed herein.

As shown, in some examples, one or more or portions of disparity module 102, image warping module 103, occlusion fill module 107, hole fill module 108, and virtual view blend module 109 are implemented via image processor 1102. In other examples, one or more or portions of one or more or portions of disparity module 102, image warping module 103, occlusion fill module 107, hole fill module 108, and virtual view blend module 109 are implemented via central processor 1101, an image processing unit, an image processing pipeline, an image signal processor, or the like. In some examples, one or more or portions of disparity module 102, image warping module 103, occlusion fill module 107, hole fill module 108, and virtual view blend module 109 are implemented in hardware as a system-on-a-chip (SoC). In some examples, one or more or portions of disparity module 102, image warping module 103, occlusion fill module 107, hole fill module 108, and virtual view blend module 109 are implemented in hardware via a FPGA.

Image processor 1102 may include any number and type of image or graphics processing units that may provide the operations as discussed herein. Such operations may be implemented via software or hardware or a combination thereof. For example, image processor 1102 may include circuitry dedicated to manipulate and/or analyze images obtained from memory 1103. Central processor 1101 may include any number and type of processing units or modules that may provide control and other high level functions for system 1100 and/or provide any operations as discussed herein. Memory 1103 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1103 may be implemented by cache memory. In an embodiment, one or more or portions of disparity module 102, image warping module 103, occlusion fill module 107, hole fill module 108, and virtual view blend module 109 are implemented via an execution unit (EU) of image processor 1102. The EU may include, for example, programmable logic or circuitry such as a logic core or cores that may provide a wide array of programmable logic functions. In an embodiment, one or more or portions of disparity module 102, image warping module 103, occlusion fill module 107, hole fill module 108, and virtual view blend module 109 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 10, process 1000 begins at operation 1001, where where a first virtual image is generated for a selected view position between first and second view positions corresponding to first and second input images, respectively, using the first and second input images and a correspondence map therebetween. The first virtual image may be generated using any suitable technique or techniques. For example, the first and second input images may both be warped to the view position using the correspondence map (e.g., a disparity map), the resultant warped images may be occlusion filled and hole filled and the resultant refined images may be used to interpolate the first virtual image to the view position using linear interpolation or other interpolation techniques.

Processing continues at operation 1002, where horizontal and vertical gradient maps are determined for the selected view position based on horizontal and vertical gradients detected in the first and second input images and the correspondence map. The horizontal and vertical gradient maps may be determined using any suitable technique or techniques. In an embodiment, The techniques discussed with respect to operation 1001 are used. For example, horizontal and vertical gradient maps may be generated by applying gradient filters to the first and second input images, warping the resultant gradient maps to the view position, optionally performing occlusion fill and hole fill and interpolating the horizontal and vertical gradient maps for the selected view position.

Processing continues at operation 1003, where a horizontal convolution matrix and a vertical convolution matrix representative of the detection of the horizontal and vertical gradients, respectively, are generated. For example, the horizontal convolution matrix and a vertical convolution matrix may be used to generate the horizontal and vertical gradients or a horizontal convolution matrix and a vertical convolution matrix may be determined based on linear filters (or other gradient filters) used to generate the horizontal and vertical gradients. In an embodiment, the horizontal convolution matrix and the vertical convolution matrix are sparse, circulant, Toeplitz matrices.

Processing continues at operation 1004, where a convolution mask approximating an inverse of a linear combination of at least the horizontal and vertical convolution matrices is applied to a virtual intermediate gradient image including a combination of at least the first virtual image, the horizontal gradient map, and the vertical gradient map to generate a final virtual image for the selected view position. The inverse of the linear combination of at least the horizontal and vertical convolution matrices may be any inverse and the virtual intermediate gradient image may include any virtual gradient image discussed herein such as those discussed with respect to Equation (7) and elsewhere herein.

In an embodiment, the linear combination of the horizontal and vertical convolution matrices includes a sum of a product of a transpose of the horizontal convolution matrix and the horizontal convolution matrix and a product of a transpose of the vertical convolution matrix and the vertical convolution matrix. In an embodiment, the linear combination further includes a product of a weighting factor and an identity matrix such that the weighting factor weights a similarity of the final virtual image to the first virtual image over a similarity of horizontal and vertical gradients of the final virtual image to the horizontal and vertical gradient maps.

In an embodiment, the virtual intermediate gradient image includes a sum of a convolution of the horizontal gradient map by a transpose of the horizontal convolution matrix and a convolution of the vertical gradient mask by a transpose of the vertical convolution matrix. In an embodiment, the virtual intermediate gradient image further includes a product of a weighting factor and the first virtual image such that the weighting factor weights a similarity of the final virtual image to the first virtual image over a similarity of horizontal and vertical gradients of the final virtual image to the horizontal and vertical gradient maps.

In an embodiment, the linear combination of the horizontal and vertical convolution matrices includes a sum of a product of a transpose of the horizontal convolution matrix and the horizontal convolution matrix and a product of a transpose of the vertical convolution matrix and the vertical convolution matrix, and the virtual intermediate gradient image includes a sum of a convolution of the horizontal gradient map by a transpose of the horizontal convolution matrix, a convolution of the vertical gradient mask by a transpose of the vertical convolution matrix, and a product of a weighting factor and the first virtual image.

The convolution mask may have any suitable size and shape. In an embodiment, the convolution mask is a square convolution mask having dimensions of not less than 15×15 filter weights. In an embodiment, the convolution mask includes first separable filters (e.g., a first horizontal and a first vertical filter) and second separable filters (e.g., a second horizontal and a second vertical filter) and applying the convolution mask includes applying the first separable filters to the virtual gradient image to generate a first resultant filtered gradient image, applying the second separable filter to the virtual gradient image to generate a second resultant filtered gradient image, and summing the first and second filtered gradient images to generate the final virtual image.

In an embodiment, the virtual intermediate gradient image has a width, W, and a height, H, the convolution mask is a separable 2D filter mask separable to a horizontal filter having a width, M, and a vertical filter having a height, N, and applying the convolution mask includes buffering, sequentially across time instances, only M pixels of a first row of the virtual intermediate gradient image to a shift register and apply, via a row filter, the horizontal filter to the M pixels to generate a sequence of horizontally filtered pixel values for the first row, storing the sequence of horizontally filtered pixel values for the first row to one of N−1 memory modules each configured to store an entire row of W filtered pixel values of the virtual intermediate gradient image, and retrieving, in response to each of the N−1 memory modules having a row of filtered pixel values, one horizontally filtered pixel value from each of the N−1 memory modules and one horizontally filtered pixel value from the row filter, and apply the vertical filter to the N horizontally filtered pixels to generate a convolution mask filtered pixel value.

In some embodiments, applying the convolution mask further includes buffering, sequentially across further time instances, only M pixels of second through Nth rows of the virtual gradient image to the shift register and applying the horizontal filter to generate sequences of horizontally filtered pixel values for the second through Nth rows, storing the sequences of horizontally filtered pixel values for the second through N−1 rows to corresponding ones of the N−1 memory modules, and retrieving, one horizontally filtered pixel value each of the first through N−1 sequences from the N−1 memory modules and one horizontally filtered pixel value of an Nth sequence from the row filter, and apply the vertical filter to the N retrieved horizontally filtered pixel values to generate a second convolution mask filtered pixel value. In an embodiment, storing the sequences of horizontally filtered pixel values includes the processor to move the sequence of horizontally filtered pixel values for the first row to each of the N−1 memory modules.

Processing continues at operation 1005, where the final virtual image is provided for presentation to the viewer. The final virtual image may be provided for presentation using any suitable technique or techniques. In an embodiment, providing the final virtual image for presentation to the viewer includes transmitting the final virtual image to a receiving device having a display screen. In an embodiment, providing the final virtual image for presentation to the viewer includes transmitting final virtual image to a memory. As used herein, providing an image for presentation includes transmitting the image to a display device, storing the image to memory for later display, and/or transmitting the image to another device for display at that device.

Process 1000 may be repeated any number of times either in series or in parallel for any number of input image pairs, paired video frames, or the like. As discussed, process 1000 may provide for virtual images, views, image frames, video frames, etc. that correspond to a view position relative to a scene.

Process 1000 may be implemented by any suitable device, system, or platform such as those discussed herein. In an embodiment, process 1000 is implemented by a device having a memory to store the first and second input images, as well as any other discussed data structure, and a processor to perform operations 1001-1005. In an embodiment, the memory and the processor are implemented via a monolithic field programmable gate array integrated circuit. As used herein, the term monolithic indicates a device that is discrete from other devices, although it may be coupled to other devices for communication and power supply.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
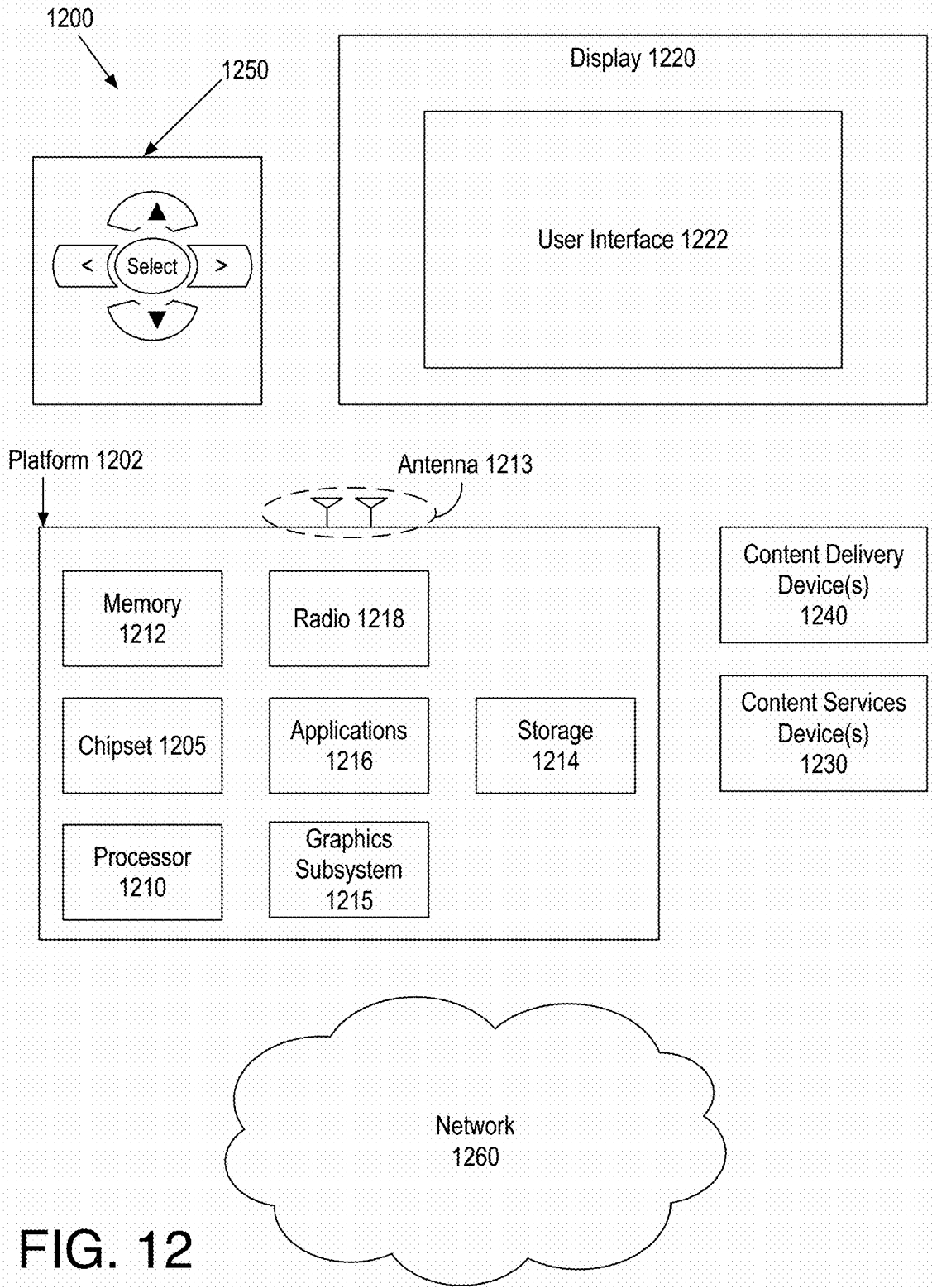
FIG. 12 is an illustrative diagram of an example system.

FIG. 12 is an illustrative diagram of an example system 1200, arranged in accordance with at least some implementations of the present disclosure. In various implementations, system 1200 may be a mobile device system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interne device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1200 includes a platform 1202 coupled to a display 1220. Platform 1202 may receive content from a content device such as content services device(s) 1230 or content delivery device(s) 1240 or other content sources such as image sensors 1219. For example, platform 1202 may receive image data as discussed herein from image sensors 1219 or any other content source. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, antenna 1213, storage 1214, graphics subsystem 1215, applications 1216, image signal processor 1217 and/or radio 1218. Chipset 1205 may provide intercommunication among processor 1210, memory 1212, storage 1214, graphics subsystem 1215, applications 1216, image signal processor 1217 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Image signal processor 1217 may be implemented as a specialized digital signal processor or the like used for image processing. In some examples, image signal processor 1217 may be implemented based on a single instruction multiple data or multiple instruction multiple data architecture or the like. In some examples, image signal processor 1217 may be characterized as a media processor. As discussed herein, image signal processor 1217 may be implemented based on a system on a chip architecture and/or based on a multi-core architecture.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1205. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

Image sensors 1219 may include any suitable image sensors that may provide image data based on a scene. For example, image sensors 1219 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1219 may include any device that may detect information of a scene to generate image data.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of navigation controller 1250 may be used to interact with user interface 1222, for example. In various embodiments, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In various embodiments, navigation controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
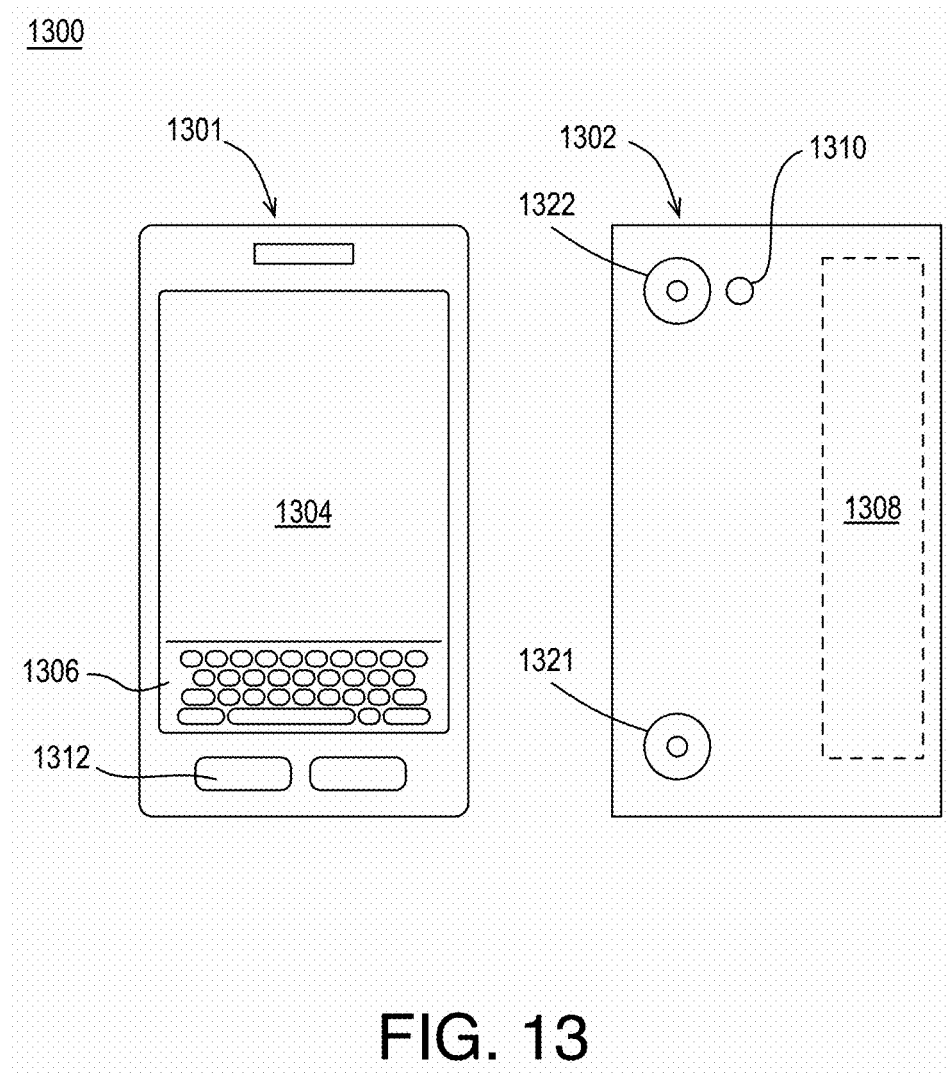
FIG. 13 illustrates an example device, all arranged in accordance with at least some implementations of the present disclosure.

As described above, system 1200 may be embodied in varying physical styles or form factors. FIG. 13 illustrates an example small form factor device 1300, arranged in accordance with at least some implementations of the present disclosure. In some examples, system 1200 may be implemented via device 1300. In other examples, other systems, components, or modules discussed herein or portions thereof may be implemented via device 1300. In various embodiments, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 13, device 1300 may include a housing with a front 1301 and a back 1302. Device 1300 includes a display 1304, an input/output (I/O) device 1306, a color camera 1321, a color camera 1322, an infrared transmitter 1323, and an integrated antenna 1308. In some embodiments, color camera 1321 and color camera 1322 attain planar images as discussed herein. In some embodiments, device 1300 does not include color camera 1321 and 1322 and device 1300 attains input image data (e.g., any input image data discussed herein) from another device. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone (not shown), or may be digitized by a voice recognition device. As shown, device 1300 may include color cameras 1321, 1322, and a flash 1310 integrated into back 1302 (or elsewhere) of device 1300. In other examples, color cameras 1321, 1322, and flash 1310 may be integrated into front 1301 of device 1300 or both front and back sets of cameras may be provided. Color cameras 1321, 1322 and a flash 1310 may be components of a camera module to originate color image data with IR texture correction that may be processed into an image or streaming video that is output to display 1304 and/or communicated remotely from device 1300 via antenna 1308 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for generating a virtual view of a scene comprises generating a first virtual image for a selected view position between first and second view positions corresponding to first and second input images, respectively, using the first and second input images and a correspondence map therebetween, determining horizontal and vertical gradient maps for the selected view position based on horizontal and vertical gradients detected in the first and second input images, and the correspondence map, determining a horizontal convolution matrix and a vertical convolution matrix representative of detection of the horizontal and vertical gradients, respectively, applying a convolution mask, the convolution mask approximating an inverse of a linear combination of at least the horizontal and vertical convolution matrices, to a virtual intermediate gradient image comprising a combination of at least the first virtual image, the horizontal gradient map, and the vertical gradient map to generate a final virtual image for the selected view position, and providing the final virtual image for presentation to a viewer.

In one or more second embodiments, further to the first embodiments, the linear combination of the horizontal and vertical convolution matrices comprises a sum of a product of a transpose of the horizontal convolution matrix and the horizontal convolution matrix and a product of a transpose of the vertical convolution matrix and the vertical convolution matrix.

In one or more third embodiments, further to the first or second embodiments, the linear combination further comprises a product of a weighting factor and an identity matrix, and the weighting factor weights a similarity of the final virtual image to the first virtual image over a similarity of horizontal and vertical gradients of the final virtual image to the horizontal and vertical gradient maps.

In one or more fourth embodiments, further to the first through third embodiments, the virtual intermediate gradient image comprises a sum of a convolution of the horizontal gradient map by a transpose of the horizontal convolution matrix and a convolution of the vertical gradient mask by a transpose of the vertical convolution matrix.

In one or more fifth embodiments, further to the first through fourth embodiments, the virtual intermediate gradient image further comprises a product of a weighting factor and the first virtual image, and the weighting factor weights a similarity of the final virtual image to the first virtual image over a similarity of horizontal and vertical gradients of the final virtual image to the horizontal and vertical gradient maps.

In one or more sixth embodiments, further to the first through fifth embodiments, the linear combination of the horizontal and vertical convolution matrices comprises a sum of a product of a transpose of the horizontal convolution matrix and the horizontal convolution matrix and a product of a transpose of the vertical convolution matrix and the vertical convolution matrix, and the virtual intermediate gradient image comprises a sum of a convolution of the horizontal gradient map by a transpose of the horizontal convolution matrix, a convolution of the vertical gradient mask by a transpose of the vertical convolution matrix, and a product of a weighting factor and the first virtual image.

In one or more seventh embodiments, further to the first through sixth embodiments, the convolution mask comprises a filter mask having dimensions of not less than 15×15 filter weights.

In one or more eighth embodiments, further to the first through seventh embodiments, the convolution mask comprises at least first separable filters and second separable filters, and applying the convolution mask comprises applying the first separable filters to the virtual gradient image to generate a first resultant filtered gradient image, applying the second separable filter to the virtual gradient image to generate a second resultant filtered gradient image, and summing the first and second filtered gradient images to generate the final virtual image.

In one or more ninth embodiments, further to the first through eighth embodiments, the virtual intermediate gradient image comprises a width, W, and a height, H, the convolution mask comprises a separable 2D filter mask separable to a horizontal filter having a width, M, and a vertical filter having a height, N, and applying the convolution mask comprises buffering, sequentially across time instances, only M pixels of a first row of the virtual intermediate gradient image to a shift register and applying, via a row filter, the horizontal filter to the M pixels to generate a sequence of horizontally filtered pixel values for the first row, storing the sequence of horizontally filtered pixel values for the first row to one of N−1 memory modules each configured to store an entire row of W filtered pixel values of the virtual intermediate gradient image, and retrieving, in response to each of the N−1 memory modules having a row of filtered pixel values, one horizontally filtered pixel value from each of the N−1 memory modules and one horizontally filtered pixel value from the row filter, and applying the vertical filter to the N horizontally filtered pixels to generate a convolution mask filtered pixel value.

In one or more tenth embodiments, further to the first through ninth embodiments, the method comprises buffering, sequentially across further time instances, only M pixels of second through Nth rows of the virtual gradient image to the shift register and applying the horizontal filter to generate sequences of horizontally filtered pixel values for the second through Nth rows, storing the sequences of horizontally filtered pixel values for the second through N−1 rows to corresponding ones of the N−1 memory modules, and retrieving, one horizontally filtered pixel value each of the first through N−1 sequences from the N−1 memory modules and one horizontally filtered pixel value of an Nth sequence from the row filter, and applying the vertical filter to the N retrieved horizontally filtered pixel values to generate a second convolution mask filtered pixel value.

In one or more eleventh embodiments, further to the first through tenth embodiments, storing the sequences of horizontally filtered pixel values comprises moving the sequence of horizontally filtered pixel values for the first row to each of the N−1 memory modules.

In one or more twelfth embodiments, a device or system includes a memory and a processor to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:
1. A device for generating a virtual view of a scene comprising:
   a memory to store first and second input images; and
   one or more processors coupled to the memory, the one or more processors to:

generate a first virtual image for a selected view position between first and second view positions corresponding to first and second input images, respectively, using the first and second input images and a correspondence map therebetween;

determine horizontal and vertical gradient maps for the selected view position based on horizontal and vertical gradients detected in the first and second input images, and the correspondence map;

determine a horizontal convolution matrix and a vertical convolution matrix representative of detection of the horizontal and vertical gradients, respectively;

apply a convolution mask, the convolution mask approximating an inverse of a linear combination of at least the horizontal and vertical convolution matrices, to a virtual intermediate gradient image comprising a combination of at least the first virtual image, the horizontal gradient map, and the vertical gradient map to generate a final virtual image for the selected view position; and provide the final virtual image for presentation to a viewer.

2. The device of claim 1, wherein the linear combination of the horizontal and vertical convolution matrices comprises a sum of a product of a transpose of the horizontal convolution matrix and the horizontal convolution matrix and a product of a transpose of the vertical convolution matrix and the vertical convolution matrix.

3. The device of claim 2, wherein the linear combination further comprises a product of a weighting factor and an identity matrix, wherein the weighting factor weights a similarity of the final virtual image to the first virtual image over a similarity of horizontal and vertical gradients of the final virtual image to the horizontal and vertical gradient maps.

4. The device of claim 1, wherein the virtual intermediate gradient image comprises a sum of a convolution of the horizontal gradient map by a transpose of the horizontal convolution matrix and a convolution of the vertical gradient mask by a transpose of the vertical convolution matrix.

5. The device of claim 4, wherein the virtual intermediate gradient image further comprises a product of a weighting factor and the first virtual image, wherein the weighting factor weights a similarity of the final virtual image to the first virtual image over a similarity of horizontal and vertical gradients of the final virtual image to the horizontal and vertical gradient maps.

6. The device of claim 1, wherein the linear combination of the horizontal and vertical convolution matrices comprises a sum of a product of a transpose of the horizontal convolution matrix and the horizontal convolution matrix and a product of a transpose of the vertical convolution matrix and the vertical convolution matrix, and wherein the virtual intermediate gradient image comprises a sum of a convolution of the horizontal gradient map by a transpose of the horizontal convolution matrix, a convolution of the vertical gradient mask by a transpose of the vertical convolution matrix, and a product of a weighting factor and the first virtual image.

7. The device of claim 1, wherein the convolution mask comprises a filter mask having dimensions of not less than 15×15 filter weights.

8. The device of claim 1, wherein the convolution mask comprises at least first separable filters and second separable filters, and the one or more processors to apply the convolution mask comprises the one or more processors to:

apply the first separable filters to the virtual gradient image to generate a first resultant filtered gradient image;

apply the second separable filter to the virtual gradient image to generate a second resultant filtered gradient image; and sum the first and second filtered gradient images to generate the final virtual image.

9. The device of claim 1, wherein the virtual intermediate gradient image comprises a width, W, and a height, H, wherein the convolution mask comprises a separable 2D filter mask separable to a horizontal filter having a width, M, and a vertical filter having a height, N, and wherein the one or more processors to apply the convolution mask comprises the one or more processors to:

buffer, sequentially across time instances, only M pixels of a first row of the virtual intermediate gradient image to a shift register and apply, via a row filter, the horizontal filter to the M pixels to generate a sequence of horizontally filtered pixel values for the first row;

store the sequence of horizontally filtered pixel values for the first row to one of N−1 memory modules each configured to store an entire row of W filtered pixel values of the virtual intermediate gradient image; and retrieve, in response to each of the N−1 memory modules having a row of filtered pixel values, one horizontally filtered pixel value from each of the N−1 memory modules and one horizontally filtered pixel value from the row filter, and apply the vertical filter to the N horizontally filtered pixels to generate a convolution mask filtered pixel value.

10. The device of claim 9, the one or more processors further to:

buffer, sequentially across further time instances, only M pixels of second through Nth rows of the virtual gradient image to the shift register and applying the horizontal filter to generate sequences of horizontally filtered pixel values for the second through Nth rows;

store the sequences of horizontally filtered pixel values for the second through N−1 rows to corresponding ones of the N−1 memory modules; and retrieve, one horizontally filtered pixel value each of the first through N−1 sequences from the N−1 memory modules and one horizontally filtered pixel value of an Nth sequence from the row filter, and apply the vertical filter to the N retrieved horizontally filtered pixel values to generate a second convolution mask filtered pixel value.

11. The device of claim 10, wherein the one or more processors to store the sequences of horizontally filtered pixel values comprises the one or more processors to move the sequence of horizontally filtered pixel values for the first row to each of the N−1 memory modules.

12. The device of claim 1, wherein the memory and the one or more processors are implemented via a monolithic field programmable gate array.

13. A method for generating a virtual view of a scene comprising:

generating a first virtual image for a selected view position between first and second view positions corresponding to first and second input images, respectively, using the first and second input images and a correspondence map therebetween;

determining horizontal and vertical gradient maps for the selected view position based on horizontal and vertical gradients detected in the first and second input images, and the correspondence map;

determining a horizontal convolution matrix and a vertical convolution matrix representative of detection of the horizontal and vertical gradients, respectively;

applying a convolution mask, the convolution mask approximating an inverse of a linear combination of at least the horizontal and vertical convolution matrices, to a virtual intermediate gradient image comprising a combination of at least the first virtual image, the horizontal gradient map, and the vertical gradient map to generate a final virtual image for the selected view position; and providing the final virtual image for presentation to a viewer.

14. The method of claim 13, wherein the linear combination of the horizontal and vertical convolution matrices comprises a sum of a product of a transpose of the horizontal convolution matrix and the horizontal convolution matrix and a product of a transpose of the vertical convolution matrix and the vertical convolution matrix.

15. The method of claim 13, wherein the virtual intermediate gradient image comprises a sum of a convolution of the horizontal gradient map by a transpose of the horizontal convolution matrix and a convolution of the vertical gradient mask by a transpose of the vertical convolution matrix.

16. The method of claim 13, wherein the linear combination of the horizontal and vertical convolution matrices comprises a sum of a product of a transpose of the horizontal convolution matrix and the horizontal convolution matrix and a product of a transpose of the vertical convolution matrix and the vertical convolution matrix, and wherein the virtual intermediate gradient image comprises a sum of a convolution of the horizontal gradient map by a transpose of the horizontal convolution matrix, a convolution of the vertical gradient mask by a transpose of the vertical convolution matrix, and a product of a weighting factor and the first virtual image.

17. The method of claim 13, wherein the virtual intermediate gradient image comprises a width, W, and a height, H, wherein the convolution mask comprises a separable 2D filter mask separable to a horizontal filter having a width, M, and a vertical filter having a height, N, and wherein applying the convolution mask comprises:

buffering, sequentially across time instances, only M pixels of a first row of the virtual intermediate gradient image to a shift register and applying, via a row filter, the horizontal filter to the M pixels to generate a sequence of horizontally filtered pixel values for the first row;

storing the sequence of horizontally filtered pixel values for the first row to one of N−1 memory modules each configured to store an entire row of W filtered pixel values of the virtual intermediate gradient image; and retrieving, in response to each of the N−1 memory modules having a row of filtered pixel values, one horizontally filtered pixel value from each of the N−1 memory modules and one horizontally filtered pixel value from the row filter, and applying the vertical filter to the N horizontally filtered pixels to generate a convolution mask filtered pixel value.

18. The method of claim 17, further comprising:

buffering, sequentially across further time instances, only M pixels of second through Nth rows of the virtual gradient image to the shift register and applying the horizontal filter to generate sequences of horizontally filtered pixel values for the second through Nth rows;

storing the sequences of horizontally filtered pixel values for the second through N−1 rows to corresponding ones of the N−1 memory modules; and retrieving, one horizontally filtered pixel value each of the first through N−1 sequences from the N−1 memory modules and one horizontally filtered pixel value of an Nth sequence from the row filter, and applying the vertical filter to the N retrieved horizontally filtered pixel values to generate a second convolution mask filtered pixel value.

19. At least one non-transitory machine readable medium comprising a plurality of instructions that, in response to being executed on a computing device, cause the computing device to generate a virtual view of a scene by:

generating a first virtual image for a selected view position between first and second view positions corresponding to first and second input images, respectively, using the first and second input images and a correspondence map therebetween;

determining horizontal and vertical gradient maps for the selected view position based on horizontal and vertical gradients detected in the first and second input images, and the correspondence map;

determining a horizontal convolution matrix and a vertical convolution matrix representative of detection of the horizontal and vertical gradients, respectively;

applying a convolution mask, the convolution mask approximating an inverse of a linear combination of at least the horizontal and vertical convolution matrices, to a virtual intermediate gradient image comprising a combination of at least the first virtual image, the horizontal gradient map, and the vertical gradient map to generate a final virtual image for the selected view position; and providing the final virtual image for presentation to a viewer.

20. The non-transitory machine readable medium of claim 19, wherein the linear combination of the horizontal and vertical convolution matrices comprises a sum of a product of a transpose of the horizontal convolution matrix and the horizontal convolution matrix and a product of a transpose of the vertical convolution matrix and the vertical convolution matrix.

21. The non-transitory machine readable medium of claim 19, wherein the virtual intermediate gradient image comprises a sum of a convolution of the horizontal gradient map by a transpose of the horizontal convolution matrix and a convolution of the vertical gradient mask by a transpose of the vertical convolution matrix.

22. The non-transitory machine readable medium of claim 19, wherein the linear combination of the horizontal and vertical convolution matrices comprises a sum of a product of a transpose of the horizontal convolution matrix and the horizontal convolution matrix and a product of a transpose of the vertical convolution matrix and the vertical convolution matrix, and wherein the virtual intermediate gradient image comprises a sum of a convolution of the horizontal gradient map by a transpose of the horizontal convolution matrix, a convolution of the vertical gradient mask by a transpose of the vertical convolution matrix, and a product of a weighting factor and the first virtual image.

23. The non-transitory machine readable medium of claim 19, wherein the virtual intermediate gradient image comprises a width, W, and a height, H, wherein the convolution mask comprises a separable 2D filter mask separable to a horizontal filter having a width, M, and a vertical filter having a height, N, and wherein applying the convolution mask comprises:

buffering, sequentially across time instances, only M pixels of a first row of the virtual intermediate gradient image to a shift register and applying, via a row filter, the horizontal filter to the M pixels to generate a sequence of horizontally filtered pixel values for the first row;

storing the sequence of horizontally filtered pixel values for the first row to one of N−1 memory modules each configured to store an entire row of W filtered pixel values of the virtual intermediate gradient image; and retrieving, in response to each of the N−1 memory modules having a row of filtered pixel values, one horizontally filtered pixel value from each of the N−1 memory modules and one horizontally filtered pixel value from the row filter, and applying the vertical filter to the N horizontally filtered pixels to generate a convolution mask filtered pixel value.

\* \* \* \* \*